(12) United States Patent
Ellison et al.

(10) Patent No.: US 11,001,521 B2
(45) Date of Patent: May 11, 2021

(54) ALUMINOSILICATE GLASSES

(71) Applicant: CORNING INCORPORATED, Corning, NY (US)

(72) Inventors: Adam James Ellison, Corning, NY (US); Jacques Gollier, Sammamish, WA (US); Timothy James Kiczenski, Corning, NY (US); Ellen Anne King, Savona, NY (US); Luis Alberto Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/239,878

(22) Filed: Jan. 4, 2019

(65) Prior Publication Data

US 2019/0135680 A1    May 9, 2019

Related U.S. Application Data

(63) Continuation of application No. 15/594,033, filed on May 12, 2017, now Pat. No. 10,173,920, which is a
(Continued)

(51) Int. Cl.
*C03C 3/091* (2006.01)
*C03C 3/093* (2006.01)
(Continued)

(52) U.S. Cl.
CPC .............. *C03C 3/091* (2013.01); *C03C 3/085* (2013.01); *C03C 3/087* (2013.01); *C03C 3/093* (2013.01);
(Continued)

(58) Field of Classification Search
CPC .......... C03C 3/085; C03C 3/087; C03C 3/091
See application file for complete search history.

(56) References Cited

U.S. PATENT DOCUMENTS 5,664,353 A    9/1997 Brauer et al.
6,483,613 B1 *  11/2002 Woodgate ............ G02B 5/1876
                                                           349/104
(Continued)

FOREIGN PATENT DOCUMENTS

CN         101452146 A         6/2009
CN         101936509 A         1/2011
(Continued)

OTHER PUBLICATIONS

English Translation of CN201580044002.3 Notice of First Office Action dated Oct. 9, 2018; 9 Pages; Chinese Patent Office.
(Continued)

*Primary Examiner* — Noah S Wiese
(74) *Attorney, Agent, or Firm* — Ryan T. Hardee

(57) ABSTRACT

Compounds, compositions, articles, devices, and methods for the manufacture of light guide plates and back light units including such light guide plates made from glass. In some embodiments, light guide plates (LGPs) are provided that have similar or superior optical properties to light guide plates made from PMMA and that have exceptional mechanical properties such as rigidity, CTE and dimensional stability in high moisture conditions as compared to PMMA light guide plates.

38 Claims, 8 Drawing Sheets

Related U.S. Application Data continuation of application No. 14/734,707, filed on Jun. 9, 2015, now Pat. No. 9,902,644.

(60) Provisional application No. 62/132,258, filed on Mar. 12, 2015, provisional application No. 62/114,825, filed on Feb. 11, 2015, provisional application No. 62/026,264, filed on Jul. 18, 2014, provisional application No. 62/014,382, filed on Jun. 19, 2014.

(51) Int. Cl.
- *C03C 4/20* (2006.01)
- *C03C 3/087* (2006.01)
- *C03C 3/085* (2006.01)
- *F21V 8/00* (2006.01)
- *C03C 4/00* (2006.01)
- *C03C 15/02* (2006.01)
- *G02F 1/13357* (2006.01)

(52) U.S. Cl.
CPC .............. *C03C 4/0092* (2013.01); *C03C 4/20* (2013.01); *C03C 15/02* (2013.01); *G02B 6/0065* (2013.01); *G02B 6/0088* (2013.01); *G02F 1/133615* (2013.01)

(56) References Cited

U.S. PATENT DOCUMENTS

| | | | |
|---|---|---|---|
| 6,992,030 B2* | 1/2006 | Paulson | C03C 3/091 501/66 |
| 7,194,158 B2 | 3/2007 | Schultheis et al. | |
| 7,252,425 B2 | 8/2007 | Park | |
| 7,616,858 B2 | 11/2009 | Tahara et al. | |
| 7,760,977 B2 | 7/2010 | Curdt et al. | |
| 7,796,234 B2 | 9/2010 | Kleverman et al. | |
| 7,931,380 B2 | 4/2011 | Williams et al. | |
| 7,953,277 B2 | 5/2011 | Williams et al. | |
| 7,982,846 B2 | 7/2011 | Kleverman et al. | |
| 8,162,524 B2 | 4/2012 | Van Ostrand et al. | |
| 8,300,311 B2 | 10/2012 | Jelusic et al. | |
| 8,492,788 B2 | 7/2013 | Veerasamy et al. | |
| 8,497,220 B2 | 7/2013 | Murata | |
| 8,573,804 B2 | 11/2013 | Veerasamy et al. | |
| 8,669,581 B2 | 3/2014 | Jung et al. | |
| 8,691,711 B2* | 4/2014 | Nakashima | C03C 3/083 501/66 |
| 8,727,595 B2 | 5/2014 | Lai | |
| 9,522,836 B2* | 12/2016 | Gulati | C03C 3/091 |
| 10,082,616 B2 | 9/2018 | Hijiya et al. | |
| 10,173,920 B2 | 1/2019 | Ellison et al. | |
| 2004/0121896 A1 | 6/2004 | Landa et al. | |
| 2006/0099441 A1 | 5/2006 | Teyssedre et al. | |
| 2006/0120105 A1 | 6/2006 | Fechner et al. | |
| 2008/0110208 A1* | 5/2008 | Ellison | C03C 3/091 65/90 |
| 2011/0014475 A1 | 1/2011 | Murata | |
| 2011/0135938 A1 | 6/2011 | Kim et al. | |
| 2011/0216554 A1 | 9/2011 | Hattori et al. | |
| 2011/0236288 A1 | 9/2011 | Panz et al. | |
| 2011/0274916 A1* | 11/2011 | Murata | C03C 3/11 428/332 |
| 2012/0021185 A1 | 1/2012 | Sachot et al. | |
| 2012/0094075 A1 | 4/2012 | Peter et al. | |
| 2012/0102798 A1 | 5/2012 | Oki | |
| 2012/0106197 A1 | 5/2012 | Lai et al. | |
| 2012/0121915 A2 | 5/2012 | Cintora et al. | |
| 2012/0126273 A1 | 5/2012 | Korotkov et al. | |
| 2012/0170310 A1 | 7/2012 | Bita et al. | |
| 2013/0017380 A1* | 1/2013 | Murata | C03B 25/08 428/215 |
| 2013/0053233 A1 | 2/2013 | Mario et al. | |
| 2013/0101853 A1* | 4/2013 | Drake | A61J 1/05 428/410 |
| 2013/0225390 A1* | 8/2013 | Ellison | C03C 3/093 501/66 |
| 2013/0273324 A1* | 10/2013 | Moll | C03C 23/0025 428/161 |
| 2013/0314368 A1 | 11/2013 | Li et al. | |
| 2013/0343088 A1 | 12/2013 | Parusel et al. | |
| 2014/0029295 A1 | 1/2014 | Hsiao et al. | |
| 2014/0098306 A1 | 4/2014 | King et al. | |
| 2014/0152914 A1 | 6/2014 | King | |
| 2014/0191276 A1 | 7/2014 | Kim et al. | |
| 2014/0377525 A1 | 12/2014 | Kawaguchi et al. | |

FOREIGN PATENT DOCUMENTS

| | | |
|---|---|---|
| CN | 201787495 U | 4/2011 |
| CN | 102062972 A | 5/2011 |
| CN | 201984178 U | 9/2011 |
| CN | 102374493 A | 3/2012 |
| CN | 102720990 A | 10/2012 |
| CN | 103148451 A | 6/2013 |
| CN | 203249169 U | 10/2013 |
| CN | 103675990 A | 3/2014 |
| CN | 203533429 U | 4/2014 |
| EP | 2397449 A1 | 12/2011 |
| JP | 10104621 A | 4/1998 |
| JP | 2004335135 A | 11/2004 |
| JP | 2005251438 A | 9/2005 |
| JP | 2008-222542 A | 9/2008 |
| JP | 2009-084076 A | 4/2009 |
| JP | 2010059038 A | 3/2010 |
| JP | 2010113969 A | 5/2010 |
| JP | 2013045641 A | 3/2013 |
| JP | 2013116846 A | 6/2013 |
| KR | 2012015136 A | 2/2012 |
| WO | 1995012964 A1 | 5/1995 |
| WO | 1998049111 A1 | 11/1998 |
| WO | 2005085149 A1 | 9/2005 |
| WO | 2006003595 A1 | 1/2006 |
| WO | 2007/077099 A1 | 7/2007 |
| WO | 2007007099 A1 | 7/2007 |
| WO | 2007074316 A2 | 7/2007 |
| WO | 2013016157 A1 | 1/2013 |
| WO | WO2013/016157 * | 1/2013 ............ C03B 17/02 |
| WO | 2013063002 A2 | 5/2013 |
| WO | 2013130695 A1 | 9/2013 |
| WO | 2014058748 A1 | 4/2014 |
| WO | 2014061605 A1 | 4/2014 |
| WO | 2014128016 A1 | 8/2014 |
| WO | 2014/152914 A1 | 9/2014 |
| WO | 2014146944 A1 | 9/2014 |
| WO | 2015011040 A1 | 1/2015 |
| WO | 2015011042 A1 | 1/2015 |
| WO | 2015011043 A1 | 1/2015 |
| WO | 2015011044 A1 | 1/2015 |
| WO | 2015/068741 A1 | 5/2015 |
| WO | 2015071456 A1 | 5/2015 |

OTHER PUBLICATIONS

English Translation of JP2016574114 Office Action dated Jul. 3, 2019; 4 Pages; Japanese Patent Office.

Dickenson et al; "Redox Equilibria and the Structural Role of Iron in Alumino-Silicate Melts"; Contrib. Mineral. Petrol; 78; 352-357 (1981).

Merhadi and Mehdikhani "Effect of match melting temperature and raw material on iron redox state in sodium silicate glasses" [2011], J. Korean Ceram. Soc. 48:117-120.

Invitation to Pay Additional Fees; PCT/US2015/035079; dated Dec. 1, 2015; 8 Pages.

Japanese Patent Application No. 2016-574114 Decision to Grant a Patent dated Dec. 2, 2020; 5 Pages; (2 Pages of English Translation and 3 pages of Original Document) Japanese Patent Office.

(56) References Cited

OTHER PUBLICATIONS

Vietnam Patent Application No. 1-2017-00164 Office Action dated Dec. 30, 2020; 3 Pages; (1 pages of English Translation and 2 pages of Original Document); Vietnam Patent Office.

* cited by examiner

Distance Between LGP and LED

ALUMINOSILICATE GLASSES

This application is a continuation application of co-pending U.S. application Ser. No. 15/594,033 filed May 12, 2017 which is a continuation application of U.S. application Ser. No. 14/734,707 filed Jun. 9, 2015, which claims the benefit of priority to U.S. Provisional Application No. 62/132,258 filed Mar. 12, 2015, to U.S. Provisional Application No. 62/114,825 filed Feb. 11, 2015, to U.S. Provisional Application No. 62/026,264 filed Jul. 18, 2014 and to U.S. Provisional Application No. 62/014,382 filed Jun. 19, 2014 the content of each are incorporated herein by reference in their entirety.

BACKGROUND

Side lit back light units include a light guide plate (LGP) that is usually made of high transmission plastic materials such as polymethylmethacrylate (PMMA). Although such plastic materials present excellent properties such as light transmission, these materials exhibit relatively poor mechanical properties such as rigidity, coefficient of thermal expansion (CTE) and moisture absorption.

Accordingly, it would be desirable to provide an improved light guide plate having attributes that achieve an improved optical performance in terms of light transmission, scattering and light coupling as well as exhibiting exceptional mechanical performance in terms of rigidity, CTE, and moisture absorption.

SUMMARY

Aspects of the subject matter pertain to compounds, compositions, articles, devices, and methods for the manufacture of light guide plates and back light units including such light guide plates made from glass. In some embodiments, light guide plates (LGPs) are provided that have similar or superior optical properties to light guide plates made from PMMA and that have exceptional mechanical properties such as rigidity, CTE and dimensional stability in high moisture conditions as compared to PMMA light guide plates.

Principles and embodiments of the present subject matter relate in some embodiments to a light guide plate for use in a backlight unit, comprising a glass sheet with a front face having a width and a height, a back face opposite the front face, and a thickness between the front face and back face, forming four edges around the front and back faces, wherein the roughness of at least one face is less than 0.6 nm, and wherein the glass of the glass plate comprises between 50-80 mol % $SiO_2$, between 0-20 mol % $Al_2O_3$, and between 0-25 mol % $B_2O_3$, and less than 50 ppm iron (Fe) concentration. Additional embodiments relate to a glass article that can be used in display devices, in lighting applications and/or in architectural applications.

In various embodiments, the thickness of the plate is less than 1.5% of the front face height. Some embodiments also relate to a light guide plate where the thickness has a variation of less than 5%. In various embodiments, the light guide plate is obtained from a fusion draw process. In various embodiments, the light guide plate is obtained from a float glass process. Embodiments of the present subject matter also relate to a light guide plate where at least 10% of the iron is $Fe^{2+}$. Additional embodiments of the present subject matter relate to a light guide plate where greater than 20% of the iron is $Fe^{2+}$. Further embodiments relate to a light guide plate where the glass comprises less than 1 ppm of Co, Ni, and Cr. Embodiments of the present subject matter also relate to a light guide plate where the glass further comprises $R_xO$ where R is Li, Na, K, Rb, Cs, and x is 2, or R is Mg, Ca, Sr or Ba, and x is 1, and the mol % of $R_xO$ is approximately equal to the mol % of $Al_2O_3$. Additional embodiments relate to a light guide plate where at least one edge is a light injection edge that scatters light within an angle less than 12.8 degrees full width half maximum (FWHM) in transmission.

Some embodiments relate to a light guide plate where thermal conduction of the light guide plate is greater than 0.5 W/m/K. Further embodiments relate to a light guide plate where the light injection edge is obtained by grinding the edge without polishing the light injection edge. Additional embodiments relate to a light guide plate where the glass sheet further comprises a second edge adjacent to the light injection edge and a third edge opposite the second edge and adjacent to the light injection edge, wherein the second edge and the third edge scatter light within an angle of less than 12.8 degrees FWHM in reflection. In some embodiments a light guide plate is provided where the second edge and the third edge have a diffusion angle in reflection that is below 6.4 degrees.

Principles and embodiments of the present subject matter also relate to a method of making a light guide plate for use in a backlight unit, comprising forming a glass sheet and filtering out ultraviolet light during processing of the glass sheet to prevent exposure of the glass sheet to ultraviolet light. Embodiments also relate to a light guide plate where the glass sheet is formed by a float glass process followed by polishing or where the glass sheet is formed by a fusion draw process. In some embodiments, a first edge of an exemplary apparatus may be grinded to provide a light injection edge and/or two edges adjacent the first light injection edge may also be grinded wherein the light injection edge and the two edges adjacent the LED injection edge are not polished.

Some embodiments comprise a glass article, comprising a glass sheet with a front face having a width and a height, a back face opposite the front face, and a thickness between the front face and back face, forming four edges around the front and back faces, wherein the glass sheet comprises between about 50 mol % to about 90 mol % $SiO_2$, between about 0 mol % to about 20 mol % $Al_2O_3$, 0 mol % to about 20 mol % $B_2O_3$, and about 0 mol % to about 25 mol % $R_xO$, wherein R is any one or more of Li, Na, K, Rb, Cs and x is 2, or Zn, Mg, Ca, Sr or Ba and x is 1, and wherein the glass produces less than or equal to 2 dB/500 mm absorption. In further embodiments, $R_xO-Al_2O_3>0$; $0<R_xO-Al_2O_3<15$; x=2 and $R_2O-Al_2O_3<15$; $R_2O-Al_2O_3<2$; x=2 and $R_2O-Al_2O_3-MgO>-15$; $0<(R_xO-Al_2O_3)<25$, $-11<(R_2O-Al_2O_3)<11$, and $-15<(R_2O-Al_2O_3-MgO)<11$; and/or $-1<(R_2O-Al_2O_3)<2$ and $-6<(R_2O-Al_2O_3-MgO)<1$. In other embodiments, the glass article is a light guide plate. In some embodiments, a roughness of at least one face is less than 0.6 nm. In additional embodiments, the thickness of the plate is between about 0.5 mm and about 8 mm. In further embodiments, the thickness has a variation of less than 5%. In some embodiments, the light guide plate is manufactured from a fusion draw process, slot draw process, or a float process. In further embodiments, at least 10% of the iron is $Fe^{2+}$. In some embodiments, the glass article has a liquidus viscosity greater than 100 kP and a $T_{200P}$ temperature below 1760° C. In some embodiments, the glass comprises less than 1 ppm each of Co, Ni, and Cr. In some embodiments, the concentration of Fe is <about 50 ppm, <about 20 ppm, or <about 10 ppm. In other embodiments, Fe+30Cr+35Ni<about 60 ppm, Fe+30Cr+35Ni<about 40 ppm, Fe+30Cr+35Ni<about 20 ppm, or Fe+30Cr+35Ni<about 10 ppm. In some embodiments, at least one edge is a light injection edge (polished or unpolished) that scatters light within an angle less than 12.8 degrees full width half maximum (FWHM) in transmission. In some embodiments, the glass sheet further comprises a second edge adjacent to the light injection edge and a third edge opposite the second edge and adjacent to the light injection edge, wherein the second edge and the third edge scatter light within an angle of less than 12.8 degrees FWHM in reflection. The second edge and the third edge can have a diffusion angle in reflection that is below 6.4 degrees. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the density is between about 1.95 gm/cc @ 20 C to about 2.7 gm/cc @ 20 C, the Young's modulus is between about 62 GPa to about 90 GPa, and/or the CTE (0-300° C.) is between about 30×10-7/° C. to about 95×10-7/° C. In some embodiments, the glass sheet is chemically strengthened. In some embodiments, $T_{200P}$ temperature is below 1760° C., below 1730° C. or below 1700° C. In some embodiments, a liquidus viscosity can be greater than 100 kP or greater than 500 kP.

In additional embodiments, a glass article is provided comprising a glass sheet with a front face having a width and a height, a back face opposite the front face, and a thickness between the front face and back face, forming four edges around the front and back faces, wherein the glass sheet comprises between about 60 mol % to about 80 mol % $SiO_2$, between about 0.1 mol % to about 15 mol % $Al_2O_3$, 0 mol % to about 12 mol % $B_2O_3$, and about 0.1 mol % to about 15 mol % $R_2O$ and about 0.1 mol % to about 15 mol % RO, wherein R is any one or more of Li, Na, K, Rb, Cs and x is 2, or Zn, Mg, Ca, Sr or Ba and x is 1, and wherein the glass produces less than or equal to 2 dB/500 mm absorption. In some embodiments, Fe+30Cr+35Ni<about 60 ppm, Fe+30Cr+35Ni<about 40 ppm, Fe+30Cr+35Ni<about 30 ppm, or Fe+30Cr+35Ni<about 20 ppm. In some embodiments, 0<($R_xO$—$Al_2O_3$)<25, −11<($R_2O$—$Al_2O_3$)<11, and −15<($R_2O$—$Al_2O_3$—MgO)<11. In some embodiments, the glass produces less than or equal to 0.5 dB/500 mm absorption or less than or equal to 0.25 dB/500 mm absorption.

In further embodiments, a glass article is provided comprising a glass sheet having between about 50 mol % to about 90 mol % $SiO_2$, between about 0 mol % to about 15 mol % $Al_2O_3$, between about 0 mol % to about 12 mol % $B_2O_3$, and about 2 mol % to about 25 mol % $R_xO$, wherein R is any one or more of Li, Na, K, Rb, Cs and x is 2, or Zn, Mg, Ca, Sr or Ba and x is 1, and wherein Fe+30Cr+35Ni<about 60 ppm.

In additional embodiments, a light guide plate is provided comprising a glass sheet having between about 0 mol % to about 15 mol % $Al_2O_3$, and about 0 mol % to about 25 mol % $R_xO$, wherein R is any one or more of Li, Na, K, Rb, Cs and x is 2, or Zn, Mg, Ca, Sr or Ba and x is 1, and wherein Fe is <about 50 ppm. In some embodiments, the light guide plate further comprises between about 50 mol % to about 90 mol % $SiO_2$ and between about 0 mol % to about 12 mol % $B_2O_3$. In some embodiments, the glass comprises less than 1 ppm of each of Co, Ni, and Cr. In some embodiments, the glass produces less than or equal to 2 dB/500 mm of light attenuation, less than or equal to 1 dB/500 mm absorption, or less than or equal to 0.5 dB/500 mm absorption. In other embodiments, Fe+30Cr+35Ni<about 60 ppm or Fe+30Cr+35Ni<about 20 ppm. In some embodiments, the mol % of $Al_2O_3$ is < or substantially equal to the mol % $R_xO$; $R_xO$ $Al_2O_3$>0; 0<$R_xO$ $Al_2O_3$<25; x=2 and $R_2O$ $Al_2O_3$<15; $R_2O$ $Al_2O_3$<2; x=2 and $R_2O$—$Al_2O_3$—MgO>−15. In some embodiments, 0<($R_xO$—$Al_2O_3$)<25, −11<($R_2O$—$Al_2O_3$)<11, and −15<($R_2O$—$Al_2O_3$—MgO)<11. In some embodiments, −1<($R_2O$—$Al_2O_3$)<2 and −6<($R_2O$—$Al_2O_3$—MgO)<1. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the concentration of Fe is <about 20 ppm or the concentration of Fe is <about 10 ppm. In some embodiments, the glass sheet is chemically strengthened. In further embodiments, a display device comprises the light guide plate described above wherein the light guide plate further comprises a glass sheet with a front face having a width and a height, a back face opposite the front face, and a thickness between the front face and back face, forming four edges around the front and back faces, and wherein one or more edges of the light guide plate are illuminated by a light source. The light source can be selected from the group consisting of an LED, CCFL, OLED, and combinations thereof. The display device can have glass comprising less than 1 ppm of each of Co, Ni, and Cr. This glass can produce less than or equal to 2 dB/500 mm of light attenuation. In some embodiments, Fe+30Cr+35Ni<about 60 ppm and/or the mol % of $Al_2O_3$ is < or substantially equal to the mol % $R_xO$. In some embodiments, the thickness of the display device is less than 5 mm. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the concentration of Fe is <about 20 ppm.

In further embodiments, a glass article is provided comprising a glass sheet having between about 50 mol % to about 90 mol % $SiO_2$, between about 0 mol % to about 15 mol % $Al_2O_3$, between about 0 mol % to about 12 mol % $B_2O_3$, and about 2 mol % to about 25 mol % $R_xO$, wherein R is any one or more of Li, Na, K, Rb, Cs and x is 2, or Zn, Mg, Ca, Sr or Ba and x is 1, and wherein the glass produces 2 dB/500 mm or less of light attenuation in the glass sheet.

In additional embodiments, a display device is provided comprising a light guide plate comprising a glass sheet having a Young's modulus of between about 62 GPa to about 78 GPa, wherein the glass sheet comprises between about 0 mol % to about 15 mol % $Al_2O_3$ and about 2 mol % to about 25 mol % $R_xO$, wherein R is any one or more of Li, Na, K, Rb, Cs and x is 2, or Zn, Mg, Ca, Sr or Ba and x is 1, and wherein the transmittance of the glass sheet at 450 nm with at least 500 mm in length is greater than or equal to 85%, the transmittance of the glass sheet at 550 nm with at least 500 mm in length is greater than or equal to 90%, or the transmittance of the glass sheet at 630 nm with at least 500 mm in length is greater than or equal to 85%. In some embodiments, the concentration of Fe of the glass sheet is <about 50 ppm, <about 20 ppm or <about 10 ppm. In some embodiments, the thickness of the display device is less than 5 mm.

In further embodiments, a glass article is provided comprising a glass sheet having a Young's modulus of between about 62 GPa to about 78 GPa, wherein the glass sheet comprises between about 0 mol % to about 15 mol % $Al_2O_3$ and about 2 mol % to about 25 mol % $R_xO$, wherein R is any one or more of Li, Na, K, Rb, Cs and x is 2, or Zn, Mg, Ca, Sr or Ba, and x is 1, and wherein the transmittance of the glass sheet at 450 nm with at least 500 mm in length is greater than or equal to 85%, the transmittance of the glass sheet at 550 nm with at least 500 mm in length is greater than or equal to 90%, or the transmittance of the glass sheet at 630 nm with at least 500 mm in length is greater than or equal to 85%. In some embodiments, the concentration of Fe of the glass sheet is <about 50 ppm, <about 20 ppm, or <about 10 ppm. In some embodiments, the glass article is a light guide plate. In some embodiments, a display device can comprise the light guide plate described above wherein the light guide plate further comprises a glass sheet with a front face having a width and a height, a back face opposite the front face, and a thickness between the front face and back face, forming four edges around the front and back faces, and wherein one or more edges of the light guide plate are illuminated by a light source.

In additional embodiments, a glass article is provided comprising a glass sheet having between about 0 mol % to about 15 mol % $Al_2O_3$, and about 2 mol % to about 25 mol % $R_xO$, wherein R is any one or more of Li, Na, K, Rb, Cs and x is 2, or Zn, Mg, Ca, Sr or Ba and x is 1, wherein $R_xO$—$Al_2O_3$ is <25, and wherein the transmittance of the glass sheet at 450 nm with at least 500 mm in length is greater than or equal to 85%, the transmittance of the glass sheet at 550 nm with at least 500 mm in length is greater than or equal to 90%, or the transmittance of the glass sheet at 630 nm with at least 500 mm in length is greater than or equal to 85%. In some embodiments, the concentration of Fe of the glass sheet is <about 50 ppm, <about 20 ppm, or <about 10 ppm. In some embodiments, x=2 and $R_xO$—$Al_2O_3$<12; $R_xO$—$Al_2O_3$>0; $R_2O$—$Al_2O_3$<2; x=2 and wherein $R_2O$—$Al_2O_3$—MgO>-15; and/or 0<($R_xO$—$Al_2O_3$)<25, -11<($R_2O$—$Al_2O_3$)<11, and -15<($R_2O$—$Al_2O_3$—MgO)<11. In some embodiments, -1<($R_2O$—$Al_2O_3$)<2 and -6<($R_2O$—$Al_2O_3$—MgO)<1.

In further embodiments, a glass article is provided comprising a glass sheet having between about 50 mol % to about 90 mol % $SiO_2$, between about 0 mol % to about 15 mol % $Al_2O_3$, between about 0 mol % to about 12 mol % $B_2O_3$, and about 0 mol % to about 25 mol % $R_xO$, wherein R is any one or more of Li, Na, K, Rb, Cs and x is 2, or Zn, Mg, Ca, Sr or Ba and x is 1, wherein the glass produces 2 dB/500 mm or less of light attenuation in the glass sheet, and wherein 0<($R_xO$—$Al_2O_3$)<25, -11<($R_2O$—$Al_2O_3$)<11, and -15<($R_2O$—$Al_2O_3$—MgO)<11. In some embodiments, the concentration of Fe of the glass sheet is <about 50 ppm. In some embodiments, Fe+30Cr+35Ni<about 60 ppm.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings.

DETAILED DESCRIPTION

Described herein are light guide plates, methods of making light guide plates and backlight units utilizing light guide plates in accordance with embodiments of the present invention. Also described herein are articles containing glass which can be used in display devices, in lighting applications and/or in architectural applications.

Current light guide plates used in LCD backlight applications are typically made from PMMA material since this is one of the best materials in term of optical transmission in the visible spectrum. However, PMMA presents mechanical problems that make large size (e.g., 50 inch diagonal and greater) displays challenging in term of mechanical design, such as, rigidity, moisture absorption, and coefficient of thermal expansion (CTE).

With regard to rigidity, conventional LCD panels are made of two pieces of thin glass (color filter substrate and TFT substrate) with a PMMA light guide and a plurality of thin plastic films (diffusers, dual brightness enhancement films (DBEF) films, etc.). Due to the poor elastic modulus of PMMA, the overall structure of the LCD panel does not have sufficient rigidity, and additional mechanical structure is necessary to provide stiffness for the LCD panel. It should be noted that PMMA generally has a Young's modulus of about 2 GPa, while certain exemplary glasses have a Young's modulus ranging from about 60 GPa to 90 GPa or more.

Figure 2:
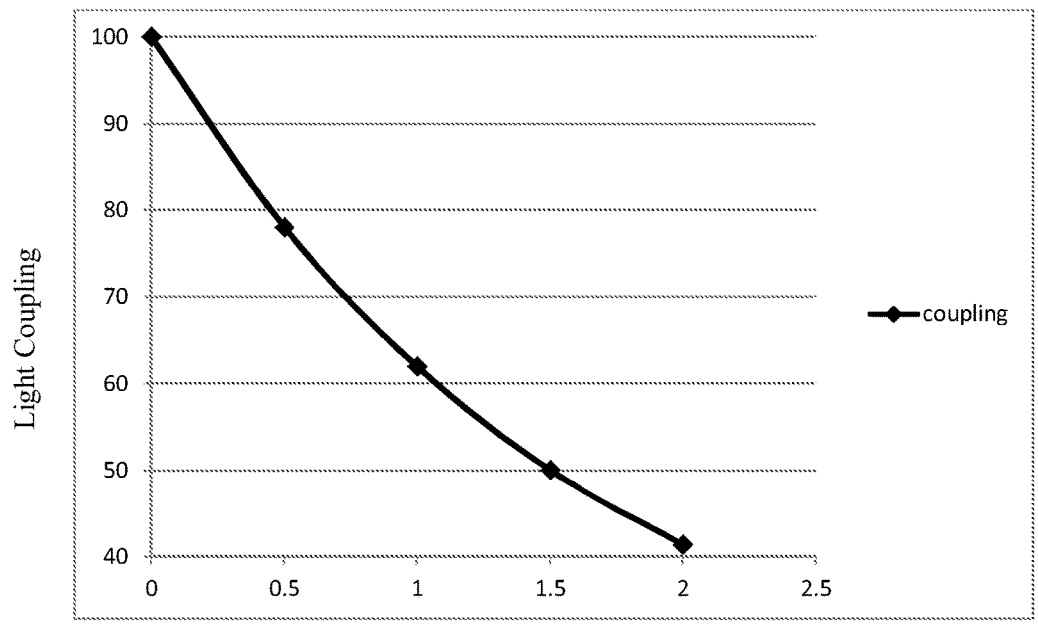
FIG. 2 is a graph showing percentage light coupling versus distance between an LED and LGP edge.

Regarding moisture absorption, humidity testing shows that PMMA is sensitive to moisture and size can change by about 0.5%. For a PMMA panel having a length of one meter, this 0.5% change can increase the length by 5 mm, which is significant and makes the mechanical design of a corresponding backlight unit challenging. Conventional means to solve this problem is leaving an air gap between the light emitting diodes (LEDs) and the PMMA light guide plate (LGP) to let the material expand. A problem with this approach is that light coupling is extremely sensitive to the distance from the LEDs to the LGP, which can cause the display brightness to change as a function of humidity. FIG. 2 is a graph showing percentage light coupling versus distance between an LED and LGP edge. With reference to FIG. 2, a relationship is shown which illustrates the drawbacks of conventional measures to solve challenges with PMMA. More specifically, FIG. 2 illustrates a plot of light coupling versus LED to LGP distance assuming both are 2 mm in height. It can be observed that the further the distance between LED and LGP, a less efficient light coupling is made between the LED and LGP. It should be noted however, that while many embodiments are described herein relating to light guide plates and other display-related applications, the claims appended herewith should not be so limited as the glass articles described herein can also find utility in lighting applications and in architectural applications.

With regard to CTE, the CTE of PMMA is about 75E-6 $C^{-1}$ and has relatively low thermal conductivity (0.2 W/m/K) while some glasses have a CTE of about 8E-6 $C^{-1}$ and a thermal conductivity of 0.8 W/m/K. Of course, the CTE of other glasses can vary and such a disclosure should not limit the scope of the claims appended herewith. PMMA also has a transition temperature of about 105° C., and when used an LGP, a PMMA LGP material can become very hot whereby its low conductivity makes it difficult to dissipate heat. Accordingly, using glass instead of PMMA as a material for light guide plates provides benefits in this regard, but conventional glass has a relatively poor transmission compared to PMMA due mostly to iron and other impurities. Also some other parameters such as surface roughness, waviness, and edge quality polishing can play a significant role on how a glass light guide plate can perform. According embodiments of the invention, glass light guide plates for use in backlight units can have one or more of the following attributes.

Glass Light Guide Plate Structure and Composition

Figure 1:
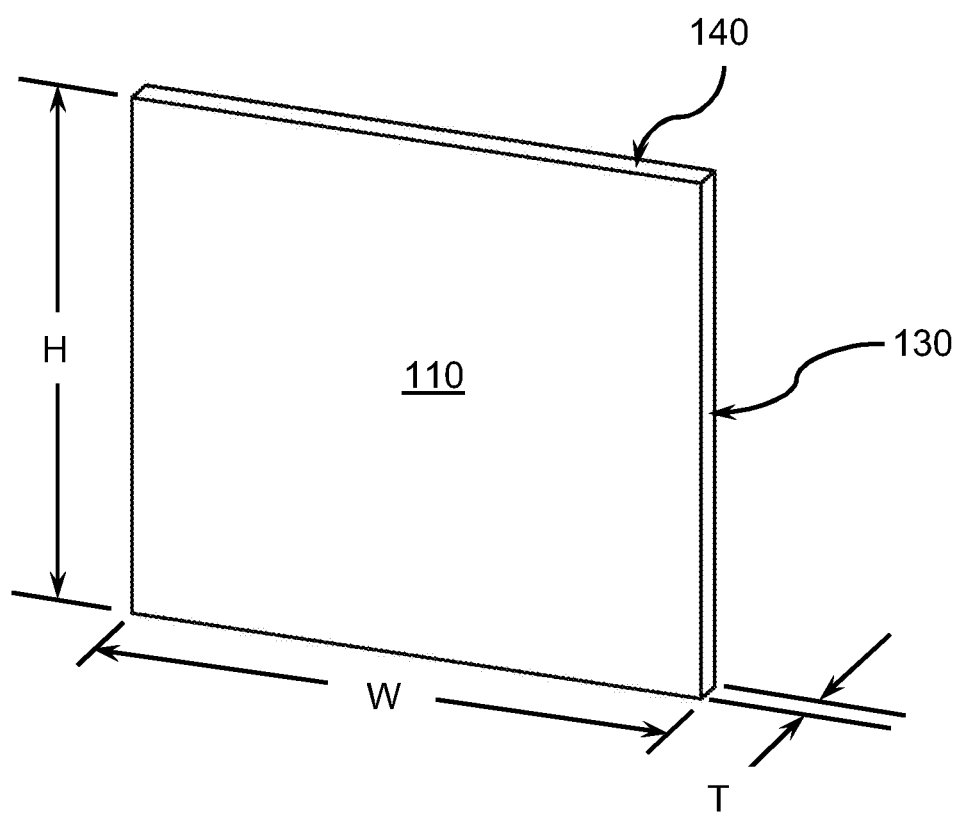
FIG. 1 is a pictorial illustration of an exemplary embodiment of a light guide plate.

FIG. 1 is a pictorial illustration of an exemplary embodiment of a light guide plate. With reference to FIG. 1, an illustration is provided of an exemplary embodiment having a shape and structure of an exemplary light guide plate comprising a sheet of glass 100 having a first face 110, which may be a front face, and a second face opposite the first face, which may be a back face. The first and second faces may have a height, H, and a width, W. The first and/or second face(s) may have a roughness that is less than 0.6 nm, less than 0.5 nm, less than 0.4 nm, less than 0.3 nm, less than 0.2 nm, less than 0.1 nm, or between about 0.1 nm and about 0.6 nm.

The glass sheet may have a thickness, T, between the front face and the back face, where the thickness forms four edges. The thickness of the glass sheet may be less than the height and width of the front and back faces. In various embodiments, the thickness of the plate may be less than 1.5% of the height of the front and/or back face. Alternatively, the thickness, T, may be less than about 3 mm, less than about 2 mm, less than about 1 mm, or between about 0.1 mm to about 3 mm. The height, width, and thickness of the light guide plate may be configured and dimensioned for use in an LCD backlight application.

A first edge 130 may be a light injection edge that receives light provided for example by a light emitting diode (LED). The light injection edge may scatter light within an angle less than 12.8 degrees full width half maximum (FWHM) in transmission. The light injection edge may be obtained by grinding the edge without polishing the light injection edge. The glass sheet may further comprise a second edge 140 adjacent to the light injection edge and a third edge opposite the second edge and adjacent to the light injection edge, where the second edge and/or the third edge scatter light within an angle of less than 12.8 degrees FWHM in reflection. The second edge 140 and/or the third edge may have a diffusion angle in reflection that is below 6.4 degrees. It should be noted that while the embodiment depicted in FIG. 1 shows a single edge 130 injected with light, the claimed subject matter should not be so limited as any one or several of the edges of an exemplary embodiment 100 can be injected with light. For example, in some embodiments, the first edge 130 and its opposing edge can both be injected with light. Such an exemplary embodiment may be used in a display device having a large and or curvilinear width W. Additional embodiments may inject light at the second edge 140 and its opposing edge rather than the first edge 130 and/or its opposing edge. Thicknesses of exemplary display devices can be less than about 10 mm, less than about 9 mm, less than about 8 mm, less than about 7 mm, less than about 6 mm, less than about 5 mm, less than about 4 mm, less than about 3 mm, or less than about 2 mm.

In various embodiments, the glass composition of the glass sheet may comprise between 50-80 mol % $SiO_2$, between 0-20 mol % $Al_2O_3$, and between 0-25 mol % $B_2O_3$, and less than 50 ppm iron (Fe) concentration. In some embodiments, there may be less than 25 ppm Fe, or in some embodiments the Fe concentration may be about 20 ppm or less. In various embodiments, the thermal conduction of the light guide plate 100 may be greater than 0.5 W/m/K. In additional embodiments, the glass sheet may be formed by a polished float glass, a fusion draw process, a slot draw process, a redraw process, or another suitable forming process.

According to one or more embodiments, the LGP can be made from a glass comprising colorless oxide components selected from the glass formers $SiO_2$, $Al_2O_3$, and $B_2O_3$. The exemplary glass may also include fluxes to obtain favorable melting and forming attributes. Such fluxes include alkali oxides ($Li_2O$, $Na_2O$, $K_2O$, $Rb_2O$ and $Cs_2O$) and alkaline earth oxides (MgO, CaO, SrO, ZnO and BaO). In one embodiment, the glass contains constituents in the range of 50-80 mol % $SiO_2$, in the range of 0-20 mol % $Al_2O_3$, in the range of 0-25 mol % $B_2O_3$, and in the range of 5 and 20% alkali oxides, alkaline earth oxides, or combinations thereof.

In various embodiments, the mol % of $Al_2O_3$ may be in the range of about 5% to about 22%, or alternatively in the range of about 10% to about 22%, or in the range of about 18% to about 22%. In some embodiments, the mol % of $Al_2O_3$ may be about 20%. In additional embodiments, the mol % of $Al_2O_3$ may be between about 4% to about 10%, or between about 6% to about 8%. In some embodiments, the mol % of $Al_2O_3$ may be about 7% to 8%.

In various embodiments, the mol % of $B_2O_3$ may be in the range of about 0% to about 20%, or alternatively in the range of about 5% to about 15%, or in the range of about 5% to about 10%, in the range of about 6% to about 8%. In some embodiments, the mol % of $B_2O_3$ may be about 5.5% or may be about 7.5%

In various embodiments, the glass may comprise $R_xO$ where R is Li, Na, K, Rb, Cs, and x is 2, or R is Zn, Mg, Ca, Sr or Ba, and x is 1, and the mol % of $R_xO$ can be approximately equal to the mol % of $Al_2O_3$. Alternatively, in various embodiments the $Al_2O_3$ mol % may be between up to 4 mol % greater than the $R_xO$ and 4 mol % less than the $R_xO$. In some embodiments, $R_xO$—$Al_2O_3 > 0$. In other embodiments, $0 < R_xO$—$Al_2O_3 < 25$, $<15$ and all subranges therebetween. In further embodiments, $x=2$ and $R_2O$—$Al_2O_3 < 25$, $<15$ and all subranges therebetween. In additional embodiments, $R_2O$—$Al_2O_3 < 2$. In yet additional embodiments, $x=2$ and $R_2O$—$Al_2O_3$—$MgO > -15$ or $> -10$. In some embodiments, $0 < (R_xO$—$Al_2O_3) < 25$, $-1 < (R_2O$—$Al_2O_3) < 11$, and $-15 < (R_2O$—$Al_2O_3$—$MgO) < 11$. In further embodiments, $-1 < (R_2O$—$Al_2O_3) < 2$ and $-6 < (R_2O$—$Al_2O_3$—$MgO) < 1$.

These ratios play significant roles in establishing the manufacturability of the glass article as well as determining its transmission performance. For example, glasses having $R_xO$—$Al_2O_3$ approximately equal to or larger than zero will tend to have better melting quality but if $R_xO$—$Al_2O_3$ becomes too large of a value, then the transmission curve will be adversely affected. Similarly, if $R_xO$—$Al_2O_3$ (e.g., $R_2O$—$Al_2O_3$) is within a given range (such as between $-2$ and 25 or between $-2$ and 15), then the glass will likely have high transmission in the visible spectrum while maintaining meltability and suppressing the liquidus temperature of a glass. Similarly, $R_2O$—$Al_2O_3$—$MgO$ being approximately equal to or greater than zero will also help suppress the liquidus temperature of the glass.

In one or more embodiments, the LGP glass can have low concentrations of elements that produce visible absorption when in a glass matrix. Such absorbers include transition elements such as Ti, V, Cr, Mn, Fe, Co, Ni and Cu, and rare earth elements with partially-filled f-orbitals, including Ce, Pr, Nd, Sm, Eu, Tb, Dy, Ho, Er and Tm. Of these, the most abundant in conventional raw materials used for glass melting are Fe, Cr and Ni. Iron is a common contaminant in sand, the source of $SiO_2$, and is a typical contaminant as well in raw material sources for aluminum, magnesium and calcium. Chromium and nickel are typically present at low concentration in normal glass raw materials, but can be present in various ores of sand and must be controlled at a low concentration. Additionally, chromium and nickel can be introduced via contact with stainless steel, e.g., when raw material or cullet is jaw-crushed, through erosion of steel-lined mixers or screw feeders, or unintended contact with structural steel in the melting unit itself. The concentration of iron in some embodiments can be specifically less than 50 ppm, more specifically less than 40 ppm, or less than 25 ppm, and the concentration of Ni and Cr can be specifically less than 5 ppm, and more specifically less than 2 ppm. In further embodiments, the concentration of all other absorbers listed above may be less than 1 ppm for each. In various embodiments the glass comprises 1 ppm or less of Co, Ni, and Cr, or alternatively less than 1 ppm of Co, Ni, and Cr. In various embodiments, the transition elements (V, Cr, Mn, Fe, Co, Ni and Cu) may be present in the glass at 0.1 wt % or less. In some embodiments, the concentration of Fe can be <about 50 ppm, <about 40 ppm, <about 30 ppm, <about 20 ppm, or <about 10 ppm. In other embodiments, Fe+30Cr+35Ni<about 60 ppm, <about 50 ppm, <about 40 ppm, <about 30 ppm, <about 20 ppm, or <about 10 ppm.

Even in the case that the concentrations of transition metals are within the above described ranges, there can be matrix and redox effects that result in undesired absorption. As an example, it is well-known to those skilled in the art that iron occurs in two valences in glass, the +3 or ferric state, and the +2 or ferrous state. In glass, $Fe^{3+}$ produces absorptions at approximately 380, 420 and 435 nm, whereas $Fe^{2+}$ absorbs mostly at IR wavelengths. Therefore, according to one or more embodiments, it may be desirable to force as much iron as possible into the ferrous state to achieve high transmission at visible wavelengths. One non-limiting method to accomplish this is to add components to the glass batch that are reducing in nature. Such components could include carbon, hydrocarbons, or reduced forms of certain metalloids, e.g., silicon, boron or aluminum. However it is achieved, if iron levels were within the described range, according to one or more embodiments, at least 10% of the iron in the ferrous state and more specifically greater than 20% of the iron in the ferrous state, improved transmissions can be produced at short wavelengths. Thus, in various embodiments, the concentration of iron in the glass produces less than 1.1 dB/500 mm of attenuation in the glass sheet. Further, in various embodiments, the concentration of V+Cr+Mn+Fe+Co+Ni+Cu produces 2 dB/500 mm or less of light attenuation in the glass sheet when the ratio $(Li_2O+Na_2O+K_2O+Rb_2O+Cs_2O+MgO+ZnO+CaO+SrO+BaO)/Al_2O_3$ for borosilicate glass is $4\pm0.5$.

The valence and coordination state of iron in a glass matrix can also be affected by the bulk composition of the glass. For example, iron redox ratio has been examined in molten glasses in the system $SiO_2$—$K_2O$—$Al_2O_3$ equilibrated in air at high temperature. It was found that the fraction of iron as $Fe^{3+}$ increases with the ratio $K_2O/(K_2O+Al_2O_3)$, which in practical terms will translate to greater absorption at short wavelengths. In exploring this matrix effect, it was discovered that the ratios $(Li_2O+Na_2O+K_2O+Rb_2O+Cs_2O)/Al_2O_3$ and $(MgO+CaO+ZnO+SrO+BaO)/Al_2O_3$ can also be important for maximizing transmission in borosilicate glasses. When this ratio is $1\pm0.2$, transmission at short wavelengths can be maximized for a given iron content. This is due in part to the higher proportion of $Fe^{2+}$, and partially to matrix effects associated with the coordination environment of iron.

Glass Roughness

Figure 3:
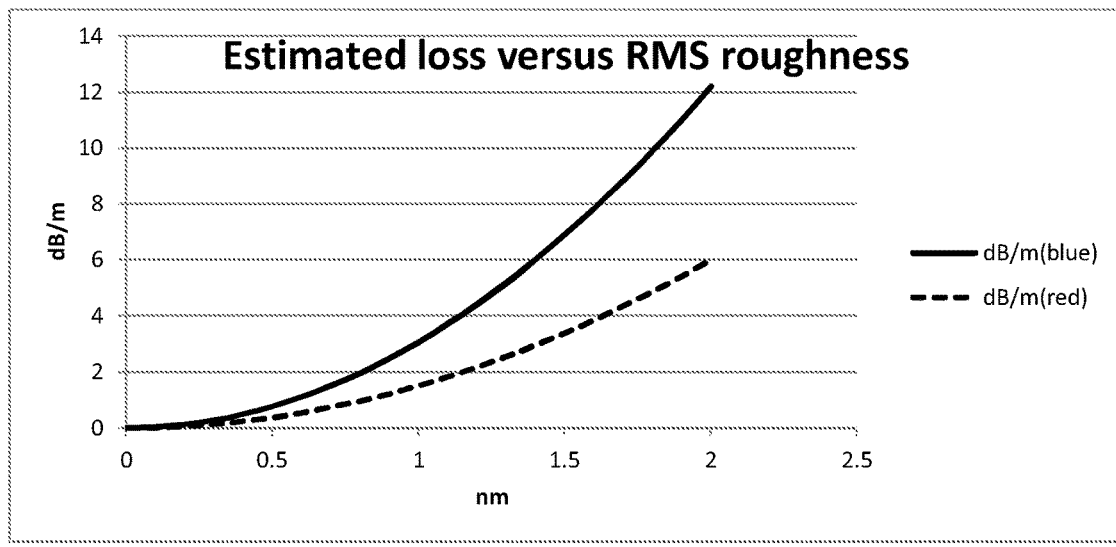
FIG. 3 is a graph showing the estimated light leakage in dB/m versus RMS roughness of an LGP.

FIG. 3 is a graph showing the estimated light leakage in dB/m versus RMS roughness of an LGP. With reference to FIG. 3, it can be shown that surface scattering plays a role in LGPs as light is bouncing many times on the surfaces thereof. The curve depicted in FIG. 3 illustrates light leakage in dB/m as a function of the RMS roughness of the LGP. FIG. 3 shows that, to get below 1 dB/m, the surface quality needs to be better than about 0.6 nm RMS. This level of roughness can be achieved by either using fusion draw process or float glass followed by polishing. Such a model assumes that roughness acts like a Lambertian scattering surface which means that we are only considering high spatial frequency roughness. Therefore, roughness should be calculated by considering the power spectral density and only take into account frequencies that are higher than about 20 microns$^{-1}$.

UV Processing

In processing exemplary glass, ultraviolet (UV) light can also be used. For instance, light extraction features are often made by white printing dots on glass and UV is used to dry the ink. Also, extraction features can be made of a polymer layer with some specific structure on it and requires UV exposure for polymerization. It has been discovered that UV exposure of glass can significantly affect transmission. According to one or more embodiments, a filter can be used during glass processing of the glass for an LGP to eliminate all wavelengths below about 400 nm. One possible filter consists in using the same glass as the one that is currently exposed.

Glass Waviness

Glass waviness is somewhat different from roughness in the sense that it is much lower frequency (in the mm or larger range). As such, waviness does not contribute to extracting light since angles are very small but it modifies the efficiency of the extraction features since the efficiency is a function of the light guide thickness. Light extraction efficiency is, in general, inversely proportional to the waveguide thickness. Therefore, to keep high frequency image brightness fluctuations below 5% (which is the human perception threshold that resulted from our sparkle human perception analysis), the thickness of the glass needs to be constant within less than 5%. Exemplary embodiments can have an A-side waviness of less than 0.3 um, less than 0.2 um, less than 1 um, less than 0.08 um, or less than 0.06 um.

Figure 4:
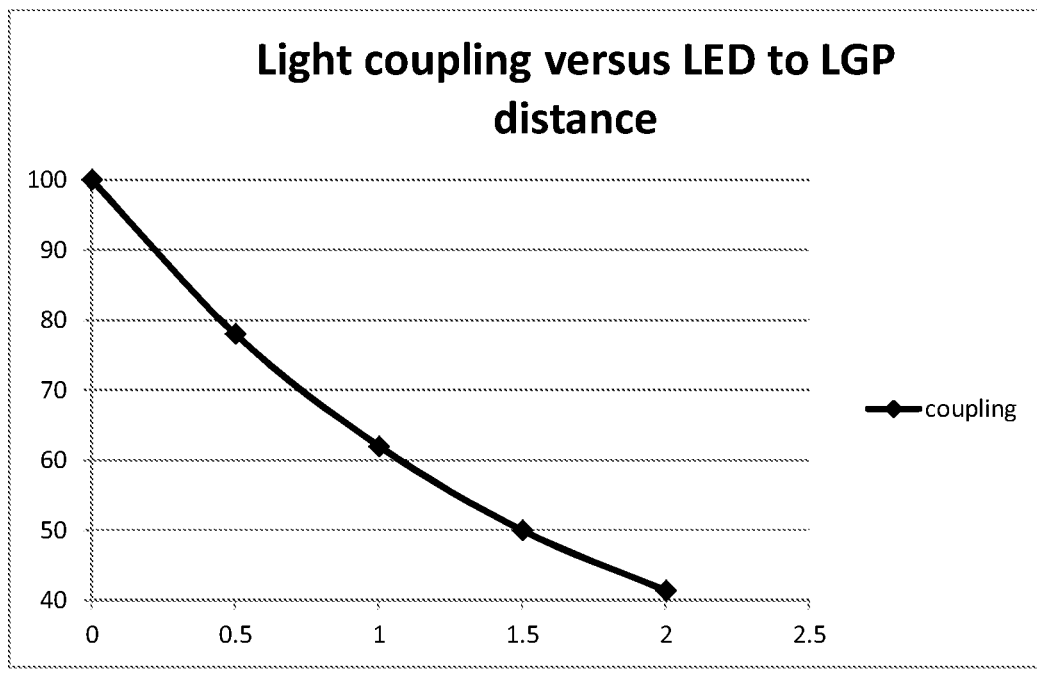
FIG. 4 is a graph showing an expected coupling (without Fresnel losses) as a function of distance between the LGP and LED for a 2 mm thick LED's coupled into a 2 mm thick LGP.

FIG. 4 is a graph showing an expected coupling (without Fresnel losses) as a function of distance between the LGP and LED for a 2 mm thick LED's coupled into a 2 mm thick LGP. With reference to FIG. 4, light injection in an exemplary embodiment usually involves placing the LGP in direct proximity to one or more light emitting diodes (LEDs). According to one or more embodiments, efficient coupling of light from an LED to the LGP involves using LED with a thickness or height that is less than or equal to the thickness of the glass. Thus, according to one or more embodiments, the distance from the LED to the LGP can be controlled to improve LED light injection. FIG. 4 shows the expected coupling (without Fresnel losses) as a function of that distance and considering 2 mm height LED's coupled into a 2 mm thick LGP. According to FIG. 4, the distance should be <about 0.5 mm to keep coupling>about 80%. When plastic such as PMMA is used as a conventional LGP material, putting the LGP in physical contact with the LED's is somewhat problematic. First, a minimum distance is needed to let the material expand. Also LEDs tend to heat up significantly and, in case of physical contact, PMMA can get close to its Tg (105° C. for PMMA). The temperature elevation that was measured when putting PMMA in contact with LED's was about 50° C. close by the LEDs. Thus for PMMA LGP, a minimum air gap is needed which degrades the coupling as shown in FIG. 4. According to embodiments of the subject matter in which glass LGPs are utilized, heating the glass is not a problem since Tg of glass is much higher and physical contact may actually be an advantage since glass has a thermal conduction coefficient that is large enough to make the LGP to be one additional heat dissipation mechanism.

Figure 5:
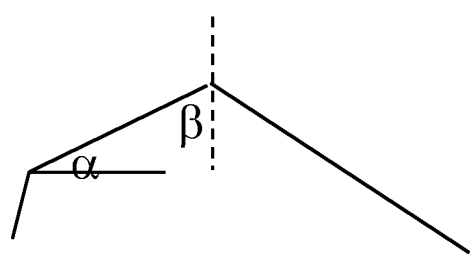
FIG. 5 is a pictorial illustration of a coupling mechanism from an LED to a glass LGP.

FIG. 5 is a pictorial illustration of a coupling mechanism from an LED to a glass LGP. With reference to FIG. 5, assuming that the LED is close to a lambertian emitter and assuming the glass index of refraction is about 1.5, the angle α will stay smaller than 41.8 degrees (as in (1/1.5)) and the angle β will stay larger than 48.2 degrees (90−α). Since total internal reflection (TIR) angle is about 41.8 degrees, this means that all the light remains internal to the guide and coupling is close to 100%. At the level of the LED injection, the injection face may cause some diffusion which will increase the angle at which light is propagating into the LGP. In the event this angle becomes larger than the TIR angle, light may leak out of the LGP resulting in coupling losses. However, the condition for not introducing significant losses is that the angle in which light gets scattered should be less than 48.2−41.8=+/−6.4 degrees (scattering angle<12.8 degrees). Thus, according to one or more embodiments, a plurality of the edges of the LGP may have a mirror polish to improve LED coupling and TIR. In some embodiments, three of the four edges have a mirror polish. Of course, these angles are exemplary only and should not limit the scope of the claims appended herewith as exemplary scattering angles can be <20 degrees, <19 degrees, <18 degrees, <17 degrees, <16 degrees, <14 degrees, <13 degrees, <12 degrees, <11 degrees, or <10 degrees. Further, exemplary diffusion angles in reflection can be, but are not limited to, <15 degrees, <14 degrees, <13 degrees, <12 degrees, <11 degrees, <10 degrees, <9 degrees, <8 degrees, <7 degrees, <6 degrees, <5 degrees, <4 degrees, or <3 degrees.

Figure 6:
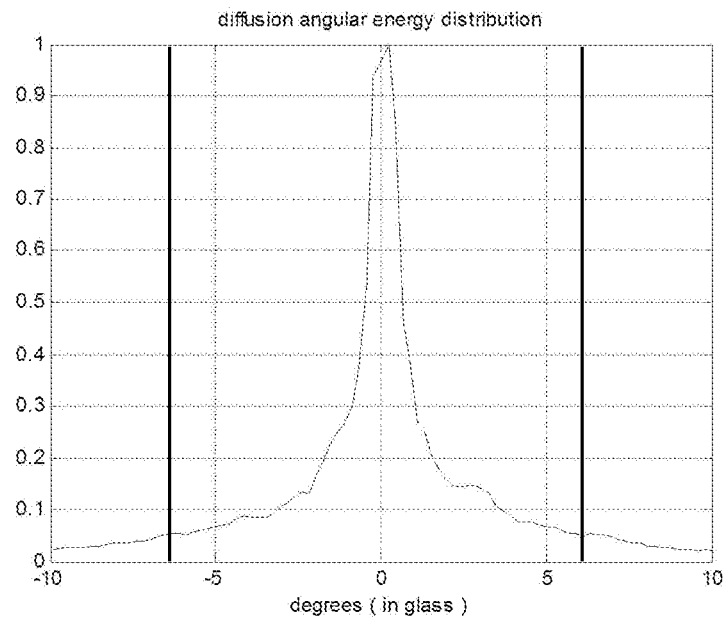
FIG. 6 is a graph showing an expected angular energy distribution calculated from surface topology.

FIG. 6 is a graph showing an expected angular energy distribution calculated from surface topology. With reference to FIG. 6, the typical texture of a grinded only edge is illustrated where roughness amplitude is relatively high (on the order of 1 nm) but special frequencies are relatively low (on the order of 20 microns) resulting in a low scattering angle. Further, this figure illustrates the expected angular energy distribution calculated from the surface topology. As can be seen, scattering angle can be much less than 12.8 degrees full width half maximum (FWHM).

In terms of surface definition, a surface can be characterized by a local slope distribution θ (x,y) that can be calculated, for instance, by taking the derivative of the surface profile. The angular deflection in the glass can be calculated, in first approximation as:

$$\theta'(x,y) = \theta(x,y)/n$$

Therefore, the condition on the surface roughness is θ(x,y) <n*6.4 degrees with TIR at the 2 adjacent edges.

Figure 7:
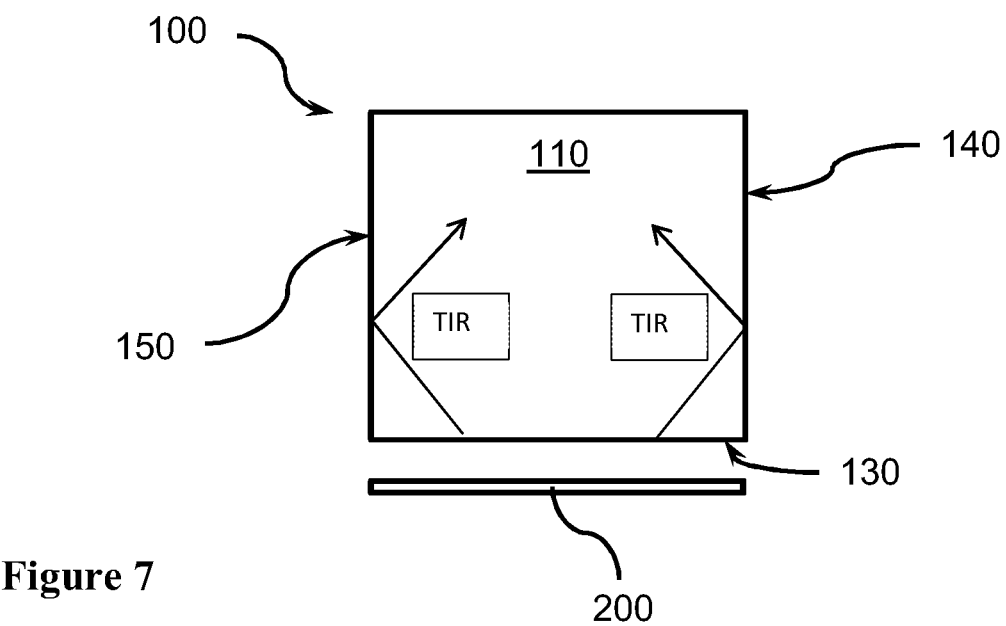
FIG. 7 is a pictorial illustration showing total internal reflection of light at two adjacent edges of a glass LGP.

FIG. 7 is a pictorial illustration showing total internal reflection of light at two adjacent edges of a glass LGP. With reference to FIG. 7, light injected into a first edge 130 can be incident on a second edge 140 adjacent to the injection edge and a third edge 150 adjacent to the injection edge, where the second edge 140 is opposite the third edge 150. The second and third edges may also have a low roughness so that the incident light undergoes total internal reflectance (TIR) from the two edges adjacent the first edge. In the event light is diffused or partially diffused at those interfaces, light may leak from each of those edges, thereby making the edges of an image appear darker. In some embodiments, light may be injected into the first edge 130 from an array of LED's 200 positioned along the first edge 130. The LED's may be located a distance of less than 0.5 mm from the light injection edge. According to one or more embodiments, the LED's may have a thickness or height that is less than or equal to the thickness of the glass sheet to provide efficient light coupling to the light guide plate 100. As discussed with reference to FIG. 1, FIG. 7 shows a single edge 130 injected with light, but the claimed subject matter should not be so limited as any one or several of the edges of an exemplary embodiment 100 can be injected with light. For example, in some embodiments, the first edge 130 and its opposing edge can both be injected with light. Additional embodiments may inject light at the second edge 140 and its opposing edge 150 rather than the first edge 130 and/or its opposing edge. According to one or more embodiments, the two edges 140, 150 may have a diffusion angle in reflection that is below 6.4 degrees such that the condition on the roughness shape is represented by θ(x,y)<6.4/2=3.2 degrees.

Color Shift Compensation

Although decreasing iron concentration can minimize absorption and yellow shift, it appears difficult to eliminate it completely. As an example, at 32 ppm, a differential absorption coefficient of about 1 dB/m between blue and red and green has been observed. This means that a one meter propagation (for a 60" diagonal display) corresponds to a differential loss of about 20%. The Δx, Δy in the measured for PMMA and 32 ppm glass for a propagation distance of about 700 mm was for PMMA 0.0021 and 0.0063 and for glass 0.0059 and 0.0163. To address residual color shift, several exemplary solutions may be implemented. In one embodiment, light guide blue painting can be employed. By blue painting the light guide, one can artificially increase absorption in red and green and increase light extraction in blue. Accordingly, knowing how much differential color absorption exists, a blue paint pattern can be back calculated and applied that can compensate for color shift.

In one or more embodiments, shallow surface scattering features can be employed to extract light with an efficiency that depends on the wavelength. As an example, a square grating has a maximum of efficiency when the optical path difference equals half of the wavelength. Accordingly, exemplary textures can be used to preferentially extract blue and can be added to the main light extraction texture. In additional embodiments, image processing can also be utilized. For example, an image filter can be applied that will attenuate blue close to the edge where light gets injected. This may require shifting the color of the LEDs themselves to keep the right white color. In further embodiments, pixel geometry can be used to address color shift by adjusting the surface ratio of the RGB pixels in the panel and increasing the surface of the blue pixels far away from the edge where the light gets injected.

LCD Panel Rigidity

One attribute of LCD panels is the overall thickness. In conventional attempts to make thinner structures, lack of sufficient stiffness has become a serious problem. Stiffness, however, can be increased with an exemplary glass LGP since the elastic modulus of glass is considerably larger than that of PMMA. In some embodiments, to obtain a maximum benefit from a stiffness point of view, all elements of the panel can be bonded together at the edge.

Figure 8:
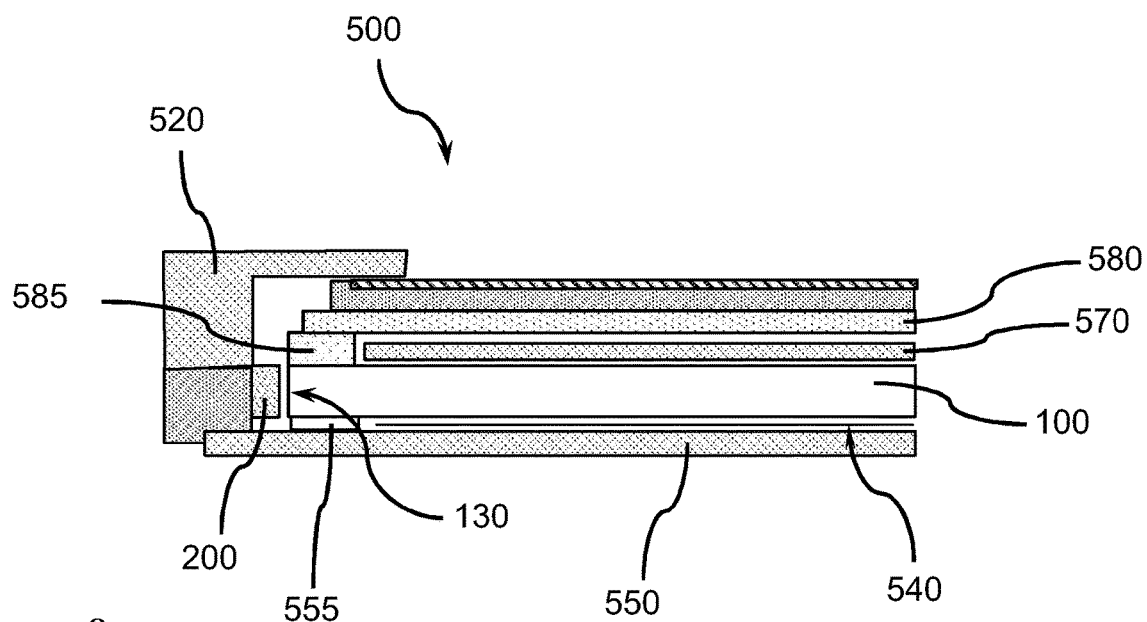
FIG. 8 is a cross sectional illustration of an exemplary LCD panel with a LGP in accordance with one or more embodiments.

FIG. 8 is a cross sectional illustration of an exemplary LCD panel with a LGP in accordance with one or more embodiments. With reference to FIG. 8, an exemplary embodiment of a panel structure 500 is provided. The structure comprises an LGP 100 mounted on a back plate 550 through which light can travel and be redirected toward the LCD or an observer. A structural element 555 may affix the LGP 100 to the back plate 550, and create a gap between the back face of the LGP and a face of the back plate. A reflective and/or diffusing film 540 may be positioned between the back face of the LGP 100 and the back plate 550 to send recycled light back through the LGP 100. A plurality of LEDs, organic light emitting diodes (OLEDs), or cold cathode fluorescent lamps (CCFLs) may be positioned adjacent to the light injection edge 130 of the LGP, where the LEDs have the same width as the thickness of the LGP 100, and are at the same height as the LGP 100. Conventional LCDs may employ LEDs or CCFLs packaged with color converting phosphors to produce white light. One or more backlight film(s) 570 may be positioned adjacent the front face of the LGP 100. An LCD panel 580 may also be positioned above the front face of the LGP 100 with a structural element 585, and the backlight film(s) 570 may be located in the gap between the LGP 100 and LCD panel 580. Light from the LGP 100 can then pass through the film 570, which can backscatter high angle light and reflect low angle light back toward the reflector film 540 for recycling and may serve to concentrate light in the forward direction (e.g., toward the user). A bezel 520 or other structural member may hold the layers of the assembly in place. A liquid crystal layer (not shown) may be used and may comprise an electro-optic material, the structure of which rotates upon application of an electric field, causing a polarization rotation of any light passing through it. Other optical components can include, e.g., prism films, polarizers, or TFT arrays, to name a few. According to various embodiments, the angular light filters disclosed herein can be paired with a transparent light guide plate in a transparent display device. In some embodiments, the LGP can be bonded to the structure (using optically clear adhesive OCA or pressure sensitive adhesive PSA) where the LGP is placed in optical contact with some of the structural elements of the panel. In other words, some of the light may leak out of the light guide through the adhesive. This leaked light can become scattered or absorbed by those structural elements. As explained above, the first edge where the LEDs are coupled into the LGP and the two adjacent edges where the light needs to be reflected in TIR can avoid this problem if properly prepared.

Exemplary widths and heights of the LGP generally depend upon the size of the respective LCD panel. It should be noted that embodiments of the present subject matter are applicable to any size LCD panel whether small (<40" diagonal) or large (>40" diagonal) displays.

Figure 9:
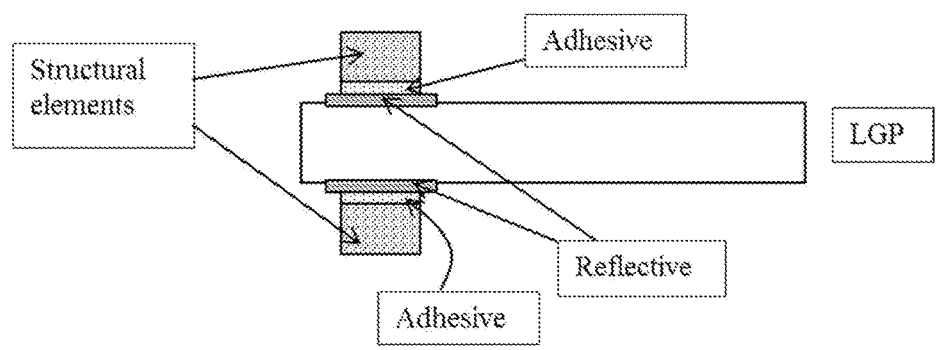
FIG. 9 is a cross sectional illustration of an exemplary LCD panel with a LGP according to another embodiment.

FIG. 9 is a cross sectional illustration of an exemplary LCD panel with a LGP according to another embodiment. With reference to FIG. 9, additional embodiments can utilize a reflective layer. Losses in some embodiments can be minimized by inserting a reflective surface between the LGP and the epoxy by either metalizing the glass with, for instance, silver or inkjet print with reflective ink. In other embodiments, highly reflective films (such as Enhanced Specular Reflector films (made by 3M)) may be laminated with the LGP.

Figure 10:
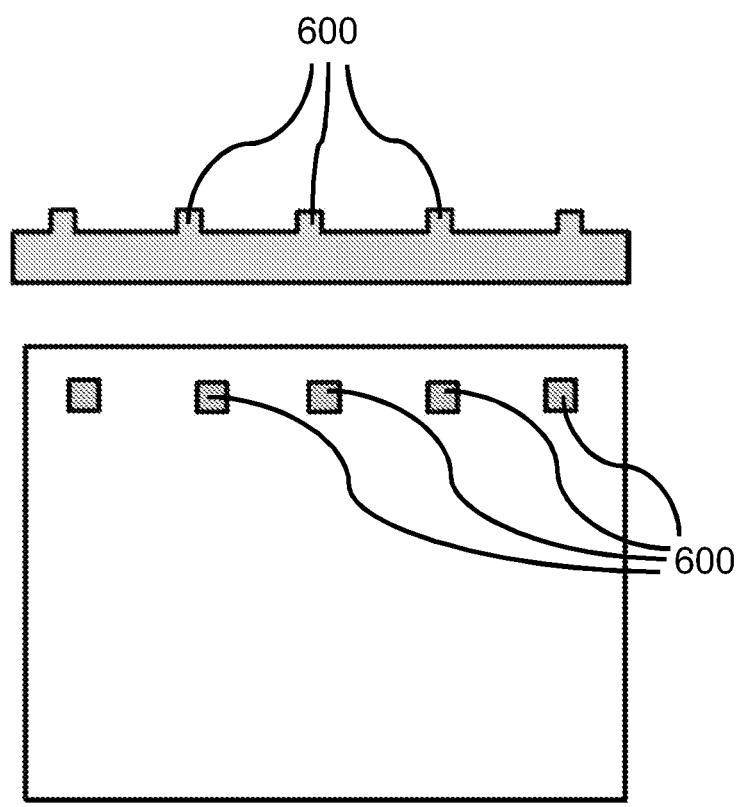
FIG. 10 is a pictorial illustration showing an LGP with adhesion pads according to additional embodiments.

FIG. 10 is a pictorial illustration showing an LGP with adhesion pads according to additional embodiments. With reference to FIG. 10, adhesion pads instead of a continuous adhesive can be used in which the pads 600 are shown as a series of dark squares. Thus, to limit the surface of LGP that is optically connected to the structural elements, the illustrated embodiment can employ 5×5 mm square pads every 50 mm to provide sufficient adhesion where extracted light is less than 4%. Of course, the pads 600 may be circular or another polygon in form and may be provided in any array or spacing and such a description should not limit the scope of the claims appended herewith.

Glass Composition

Further to the exemplary compositions about, in additional exemplary glass compositions, the ratio of $Al_2O_3$—$R_xO$ was varied. For example, glasses with $Al_2O_3$ greater than $Na_2O$ by 4 mol %, glasses with $Al_2O_3$ equal to $Na_2O$, and glasses with $Al_2O_3$ less than $Na_2O$ by −4 mol % were prepared for the following compositions shown in Table 1 below.

TABLE 1

|  | $Al_2O_3 - Na_2O = 4$ | $Al_2O_3 - Na_2O = 0$ | $Al_2O_3 - Na_2O = -4$ |
|---|---|---|---|
| SiO2 | 59.9 | 59.9 | 59.9 |
| Al2O3 | 22 | 20 | 18 |
| Na2O | 18 | 20 | 22 |
| transition element (wt %) | 0.1 | 0.1 | 0.1 |
| tramp Fe (ppm) | 20 | 20 | 20 |

Figure 11:
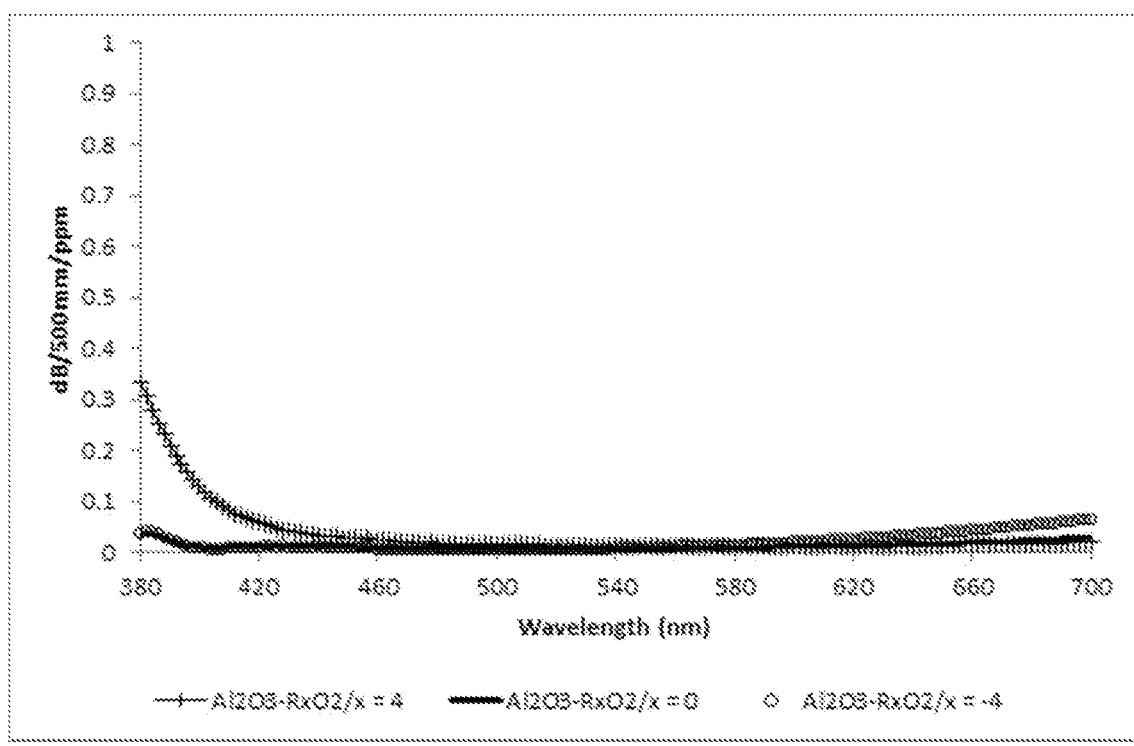
FIG. 11 is a graph showing attenuation for exemplary embodiments of glass compositions.

FIG. 11 is a graph showing attenuation for exemplary embodiments of glass compositions. With reference to FIG. 11, the figure illustrates absorption (dB/500 mm/ppm) for glass compositions with $Al_2O_3$—$R_xO$=4, $Al_2O_3$—$R_xO$=0, and $Al_2O_3$—$R_xO$=−4 and where R is Li, Na, K, Rb, Cs, Mg, Ca, Sr or Ba and x is 1 or 2. Similar results were obtained when R is an alkali cation (Li, Na, K, Rb or Cs) and when R is an alkaline earth cation (Mg, Ca, Sr, Ba) as these cations completely lose their valence electrons to oxygen and therefore cannot directly affect either the oxidation state or the coordination environment of the transition metals. When the glass has $Al_2O_3 > R_xO$ there is a low absorption at long wavelengths but a rapidly rising attenuation at short wavelengths, whereas a glass with $Al_2O_3 < R_xO$ has low attenuation at short wavelengths and high attenuation at long wavelengths. In comparison, a glass with $Al_2O_3$—$R_xO$ shows low attenuation throughout the wavelength range. A higher absorption at some wavelengths than at others can cause a "color shift" to the white light launched from the edge of the LGP. Therefore it follows that a glass with $Al_2O_3 > R_xO$ attenuates more strongly at blue wavelengths and therefore would cause a color shift of the white light toward green wavelengths.

The attenuation impact of each element may be estimated by identifying the wavelength in the visible where it attenuates most strongly. In examples shown in Table 2 below, the coefficients of absorption of the various transition metals have been experimentally determined in relation to the concentrations of $Al_2O_3$ to $R_xO$ (however, only the modifier $Na_2O$ has been shown below for brevity).

TABLE 2

| | dB/ppm/500 mm | | |
|---|---|---|---|
| | $Al_2O_3 > Na_2O$ | $Al_2O_3 = Na_2O$ | $Al_2O_3 < Na_2O$ |
| V | 0.119 | 0.109 | 0.054 |
| Cr | 2.059 | 1.869 | 9.427 |
| Mn | 0.145 | 0.06 | 0.331 |
| Fe | 0.336 | 0.037 | 0.064 |
| Co | 1.202 | 2.412 | 3.7 |
| Ni | 0.863 | 0.617 | 0.949 |
| Cu | 0.108 | 0.092 | 0.11 |

With the exception of V (vanadium), a minimum attenuation is found for glasses with concentrations of $Al_2O_3 = Na_2O$, or more generally for $Al_2O_3 \sim R_xO$. In various instances the transition metals may assume two or more valences (e.g., Fe can be both +2 and +3), so to some extent the redox ratio of these various valences may be impacted by the bulk composition. Transition metals respond differently to what are known as "crystal field" or "ligand field" effects that arise from interactions of the electrons in their partially-filled d-orbital with the surrounding anions (oxygen, in this case), particularly if there are changes in the number of anion nearest neighbors (also referred to as coordination number). Thus, it is likely that both redox ratio and crystal field effects contribute to this result.

The coefficients of absorption of the various transition metals may also be utilized to determine the attenuation of the glass composition over a path length in the visible spectrum (i.e., between 380 and 700 nm), as shown in Table 3 below.

TABLE 3

| $Al_2O_3 - R_xO = 4$ | 0.119V + 2.059Cr + 0.145Mn + 0.336Fe + 1.202Co + 0.863Ni + 0.108Cu < 2 |
|---|---|
| $Al_2O_3 \sim R_xO = 0$ | 0.109V + 1.869Cr + 0.06Mn + 0.037Fe + 2.412Co + 0.617Ni + 0.092Cu < 2 |
| $Al_2O_3 < R_xO = -4$ | 0.054V + 9.427Cr + 0.331Mn + 0.064Fe + 3.7Co + 0.949Ni + 0.11Cu < 2 |

Of course the values identified in Table 3 are exemplary only should not limit the scope of the claims appended herewith. For example, it was also unexpectedly discovered that a high transmittance glass could be obtained when Fe+30Cr+35Ni<60 ppm. In some embodiments, the concentration of Fe can be <about 50 ppm, <about 40 ppm, <about 30 ppm, <about 20 ppm, or <about 10 ppm. In other embodiments, Fe+30Cr+35Ni<about 50 ppm, <about 40 ppm, <about 30 ppm, <about 20 ppm, or <about 10 ppm.

Tables 4 and 5 provide some exemplary non-limiting examples of glasses prepared for embodiments of the present subject matter.

TABLE 4

| | wt % | mol % |
|---|---|---|
| $SiO_2$ (diff) | 58.58 | 64.66 |
| $Al_2O_3$ | 21.36 | 13.89 |
| $B_2O_3$ | 5.3 | 5.05 |
| $Na_2O$ | 12.95 | 13.86 |
| $K_2O$ | 0.01 | 0.01 |
| MgO | 1.52 | 2.5 |
| CaO | 0.03 | 0.04 |
| $Al_2O_3 - R_xO$ | | −2.52 |
| Fe (ppm) | 20 | |

TABLE 5

| | mol % |
|---|---|
| $SiO_2$ (diff) | 72.22 |
| $Al_2O_3$ | 7.62 |
| $B_2O_3$ | 7.58 |
| $Na_2O$ | 8.08 |
| SrO | 2.1 |
| MgO | 2.25 |
| $K_2O$ | |
| CaO | |
| $Al_2O_3 - R_xO$ | −4.81 |
| Fe (ppm) | <20 ppm |

All other transition metals were below detection limits. In the non-limiting examples, the value of $Al_2O_3$—$R_xO$ indicates that modifiers are in excess of aluminum, so using the table above, the predicted attenuation is roughly 60% of the way between the glasses above with $Al_2O_3$—$R_xO=0$ and $Al_2O_3$—$R_xO=-4$: 20 ppm Fe×[0.6*0.067 dB/ppm/500 mm+0.4×0.037 dB/ppm/500 mm]=1.06 dB/500 mm path length. This generally corresponds to about 78% internal transmission or more.

In some embodiments, the glass may comprise about 50 wt % to about 60 wt % $SiO_2$, about 15 wt % to about 22 wt % $Al_2O_3$, about 15 wt % to about 22 wt % $R_xO$, about 0 wt % to about 6 wt % of $B_2O_3$, and less than 50 ppm of Fe, with the proviso that the wt % of $SiO_2$ makes up the balance of the composition after determining the wt % of $Al_2O_3$, $B_2O_3$, $R_xO$, ppm of Fe, and the concentration of any other residual components (e.g., $SO_3$), which is less than 0.1 wt %. In some embodiments, the mol % of $Al_2O_3$ is approximately equal to mol % of $R_xO$ where R is Li, Na, K, Rb, Cs, and x is 2, or R is Mg, Zn, Ca, Sr or Ba, and x is 1. In some embodiments, the composition comprises 50 ppm or less of Fe, 40 ppm or less of Fe, 30 ppm or less of Fe, 20 ppm or less of Fe, 10 ppm or less of Fe, or 5 ppm or less of Fe.

In additional embodiments, the glass may comprise about 50 mol % to about 90 mol % $SiO_2$, from about 65 mol % to about 75 mol % $SiO_2$, or from about 65 mol % to about 72 mol % $SiO_2$ and all subranges therebetween. The glass may also comprise from about 0 mol % to about 15 mol % $Al_2O_3$, or from about 5 mol % to about 13 mol % $Al_2O_3$ and all subranges therebetween. The glass may further comprise from about 0 mol % to about 12 mol % $B_2O_3$, or from about 5 mol % to about 8 mol % $B_2O_3$ and all subranges therebetween. The glass may further comprise from about 2 mol % to about 25 mol % $R_xO$, from about 2 mol % to about 19 mol % $R_xO$, from about 5 mol % to about 15 mol % $R_xO$, from about 10 mol % to about 16 mol % $R_xO$, or from about 11 mol % to about 16 mol % $R_xO$ and all subranges therebetween. In such embodiments, there should be less than 50 ppm of Fe or less than 20 ppm Fe and/or the concentration of any other residual components (e.g., $SO_3$, V, Ni, etc.) should be less than 0.5 mol %. In some embodiments, the mol % of $Al_2O_3$ is approximately equal to the mol % of $R_xO$ where R is Li, Na, K, Rb, Cs, and x is 2, or R is Mg, Ca, Zn, Sr or Ba, and x is 1.

Exemplary compositions as heretofore described can thus be used to achieve a strain point ranging from about 525° C. to about 575° C., from about 540° C. to about 560° C., or from about 545° C. to about 555° C. and all subranges therebetween. In one embodiment, the strain point is about 551° C. An exemplary annealing point can range from about 575° C. to about 605° C., from about 590° C. to about 600° C., or from about 595° C. to about 600° C. and all subranges therebetween. In one embodiment, the annealing point is about 596° C. An exemplary softening point of a glass ranges from about 800° C. to about 860° C., from about 820° C. to about 840° C., or from about 825° C. to about 835° C. and all subranges therebetween. In one embodiment, the strain point is about 834° C. The density of exemplary glass compositions can range from about 1.95 gm/cc @ 20 C to about 2.7 gm/cc @ 20 C, from about 2.1 gm/cc @ 20 C to about 2.4 gm/cc @ 20 C, or from about 2.2 gm/cc @ 20 C to about 2.4 gm/cc @ 20 C and all subranges therebetween. In one embodiment the density is about 2.38 gm/cc @ 20 C. The Young's modulus of exemplary embodiments can range from about 62 GPa to about 90 GPa, from about 65 GPa to about 75 GPa, or from about 68 GPa to about 72 GPa and all subranges therebetween. In one embodiment, the Young's modulus is about 69.2 GPa. The shear modulus of exemplary embodiments can range from about 22 GPa to about 35 GPa, from about 25 GPa to about 32 GPa, or from about 28 GPa to about 30 GPa and all subranges therebetween. In one embodiment, the shear modulus is about 28.7 GPa. CTEs (0-300° C.) for exemplary embodiments can range from about $30 \times 10^{-7}$/° C. to about $95 \times 10^{-7}$/° C., from about $50 \times 10^{-7}$/° C. to about $70 \times 10^{-7}$/° C., or from about $55 \times 10^{-7}$/° C. to about $65 \times 10^{-7}$/° C. and all subranges therebetween. In one embodiment the CTE is about $55.4 \times 10^{-7}$/° C. Additional embodiments can include a Poisson's ratio from about 0.1 to about 0.3, from about 0.15 to about 0.25, from about 0.19 to about 0.21 and all subranges therebetween. In one embodiment, an exemplary Poisson's ratio is about 0.206.

Figure 12:
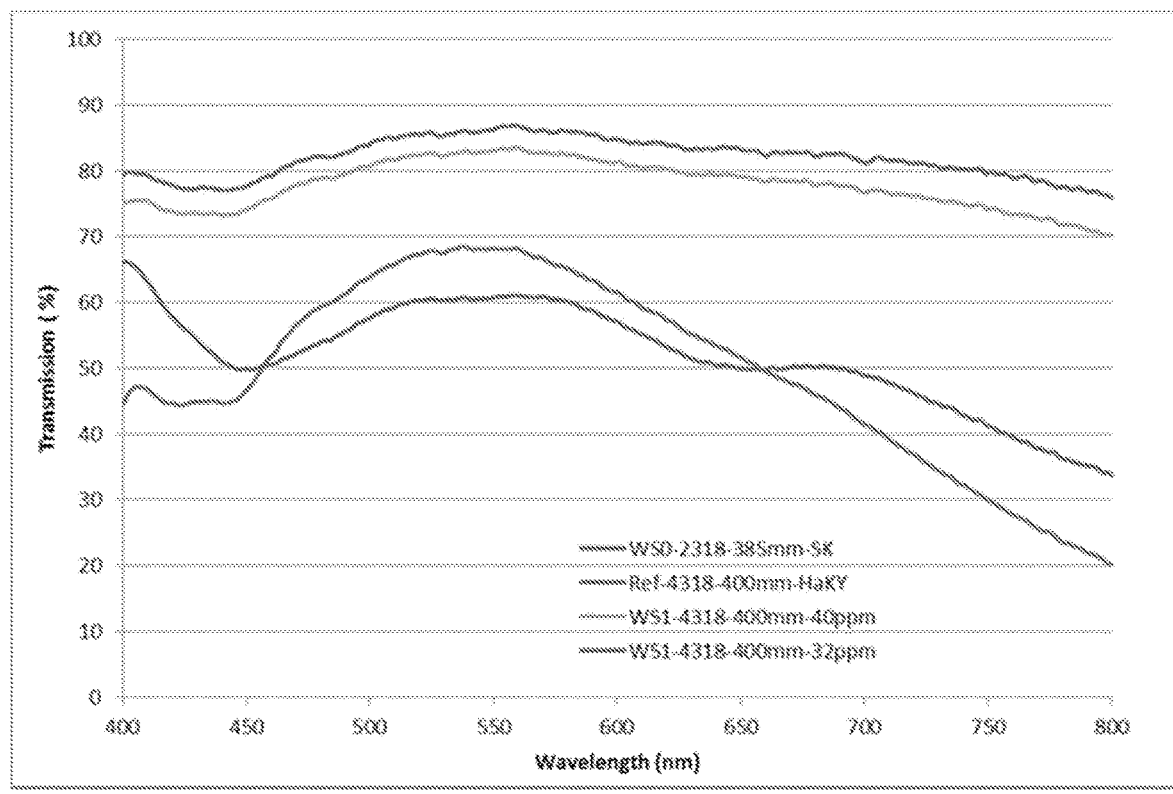
FIG. 12 is a graph showing transmission values for exemplary embodiments of glass compositions.

FIG. 12 is a graph showing transmission values for exemplary embodiments of glass composition. With reference to FIG. 12, the minimum in transmission from 400-700 nm should be about 77%, which is close to the value calculated with the coefficients. In the particular sample, the experimental glasses contained only sodium, whereas other production glass may contain sodium, magnesium, calcium, barium, strontium, zinc and potassium. The different contributing alkali or alkaline earth oxides may be summed together to calculate a total $R_xO$, such that the modifier may be any of the alkali or alkaline earth oxides. Furthermore, the attenuation that is obtained is unaffected by the $SiO_2$ and $B_2O_3$, as demonstrated in this example, and thus their relative proportions do not directly affect the result. While not shown in FIG. 12, certain embodiments and compositions described in the previous paragraphs have provided a transmission from 400-700 nm greater than 90%, greater than 91%, greater than 92%, greater than 93%, greater than 94%, and even greater than 95%. Thus, exemplary embodiments described herein can have a transmittance at 450 nm with 500 mm in length of greater than 85%, greater than 90%, greater than 91%, greater than 92%, greater than 93%, greater than 94%, and even greater than 95%. Exemplary embodiments described herein can also have a transmittance at 550 nm with 500 mm in length of greater than 90%, greater than 91%, greater than 92%, greater than 93%, greater than 94%, and even greater than 96%. Further embodiments described herein can have a transmittance at 630 nm with 500 mm in length of greater than 85%, greater than 90%, greater than 91%, greater than 92%, greater than 93%, greater than 94%, and even greater than 95%.

The various embodiments, therefore relate to a silicate or borosilicate glass comprimising $Al_2O_3$ and further comprising modifier oxides selected from the list $Li_2O$, $Na_2O$, $K_2O$, $Rb_2O$, $Cs_2O$, MgO, ZnO, CaO, SrO, BaO, such that $-4 <= Al_2O_3 - R_xO <= 4$, and the total concentration of all transition metals in ppm satisfies an appropriately weighted sums of the formulas presented in in Table 2 above.

As a further example, a glass satisfying these constraints may show an attenuation between 380 nm and 700 nm of no more than 2 dB (about 63% minimum transmission) over a path length of 500 mm. For LGPs with dimensions less than 500 mm, for example in smaller devices, such as the displays in notebook computers, the shorter path length can result in a greater transmission (e.g., for a 250 mm path (9.8"), the attenuation would be 1 dB). Principles and embodiments of the present subject matter also relate to sheets of optical quality glass prepare by a fusion draw-down process for light guide plates.

One or more embodiments relate to glass sheets having a width of at least about 1143 mm (45 inches) and a thickness of between 2 mm and 8 mm, with an attenuation of less than 4 dB for light wavelengths between about 380 nm and about 700 nm. Using wt %, the glass may be high silica content glasses having a composition of between about 80 wt % and 95 wt % $SiO_2$, and between about 14 wt % and 4 wt % $B_2O_3$, between about 2 wt % and 4 wt % $Na_2O$, with a balance comprising $Al_2O_3$ and/or $K_2O$. In various embodiments, the $SiO_2$, $B_2O_3$, $Na_2O$, $Al_2O_3$, and $K_2O$, components are all essentially free of iron (Fe) (i.e., less than 20 ppm Fe (20 mg. Fe/kg. of glass)), and particularly free of iron in a +3 oxidation state ($Fe^{3+}$) (i.e., the Fe includes less than about 80% Fe as $Fe^{3+}$. In various embodiments, the glass has a composition consisting essentially of between about 4 wt % and 14 wt % $B_2O_3$, between about 2 wt % and 4% $Na_2O$, between about 2 wt % and 4% $Al_2O_3$ and/or $K_2O$, and the balance $SiO_2$, where each of the components is essentially iron free (i.e., less than 20 ppm Fe (20 mg. Fe/kg. of glass)).

Embodiments that consist essentially of $SiO_2$, $B_2O_3$, $Na_2O$, and $K_2O$, exclude $Al_2O_3$, $Li_2O$, $Rb_2O$, $Cs_2O$, MgO, CaO, SrO, ZnO, and BaO, and includes essentially no Fe, Ni, Co, or Cr (i.e., less than 20 ppm Fe, Ni, Co, or Cr, as the oxide). Essentially free also indicates that none of the Fe, Ni, Co, or Cr that may be present was intentionally added to the glass composition. In various embodiments, the Fe includes less than 10 ppm Fe as $Fe^{3+}$. The ferric iron ($Fe^{3+}$) is minimized while the ferrous iron ($Fe^{3+}$) is maximized to reduce the absorption in the UV/blue region of the visible spectrum, which may otherwise produce a yellow tint.

In various embodiments, cerium oxide ($CeO_2$) may be excluded from the glass composition to reduce the amount of $Fe^{3+}$. In one or more embodiments, the base glass materials (e.g., $SiO_2$, $B_2O_3$, $Na_2O$, $Al_2O_3$, and $K_2O$) are all of high purity and essentially free of Fe, Ni, Co, and Cr. Using wt %, one or more embodiments consists essentially of at least 81 wt % $SiO_2$, at least 10 wt % $B_2O_3$, at least 2 wt % $Na_2O$, and at least 2 wt % $K_2O$ with the proviso that neither the $Na_2O$ nor the $K_2O$ makes up more than 4 wt % of the total glass composition. One or more embodiments consist essentially of about 80 wt % $SiO_2$, about 14 wt % $B_2O_3$, about 4 wt % $Na_2O$, and about 2 wt % $K_2O$, with essentially no Fe, Ni, Co, or Cr. In various embodiments the glass comprises 2 ppm or less of Co, Ni, and Cr, or 1 ppm or less of Co, Ni, and Cr, or less than 1 ppm of Co, Ni, and Cr. In various embodiments, the concentration of V+Cr+ Mn+Fe+Co+Ni+Cu<20 ppm. One or more embodiments relate to light guide plate having a composition consisting essentially of $SiO_2$, $B_2O_3$, $Na_2O$, $Al_2O_3$, and $K_2O$, wherein the glass sheet has a width of at least 1143 mm (45 in.) and a thickness of between 2 mm and 8 mm, and a transmission of at least 80% across the width of the LGP.

In one or more embodiments, the LGP has a width of at least about 1270 mm and a thickness of between about 0.5 mm and about 3.0 mm, wherein the transmittance of the LGP is at least 80% per 500 mm. In various embodiments, the thickness of the LGP is between about 1 mm and about 8 mm, and the width of the plate is between about 1100 mm and about 1300 mm.

In one or more embodiments, the LGP can be strengthened. For example, certain characteristics, such as a moderate compressive stress (CS), high depth of compressive layer (DOL), and/or moderate central tension (CT) can be provided in an exemplary glass sheet used for a LGP. One exemplary process includes chemically strengthening the glass by preparing a glass sheet capable of ion exchange. The glass sheet can then be subjected to an ion exchange process, and thereafter the glass sheet can be subjected to an anneal process if necessary. Of course, if the CS and DOL of the glass sheet are desired at the levels resulting from the ion exchange step, then no annealing step is required. In other embodiments, an acid etching process can be used to increase the CS on appropriate glass surfaces. The ion exchange process can involve subjecting the glass sheet to a molten salt bath including $KNO_3$, preferably relatively pure $KNO_3$ for one or more first temperatures within the range of about 400-500° C. and/or for a first time period within the range of about 1-24 hours, such as, but not limited to, about 8 hours. It is noted that other salt bath compositions are possible and would be within the skill level of an artisan to consider such alternatives. Thus, the disclosure of $KNO_3$ should not limit the scope of the claims appended herewith. Such an exemplary ion exchange process can produce an initial CS at the surface of the glass sheet, an initial DOL into the glass sheet, and an initial CT within the glass sheet. Annealing can then produce a final CS, final DOL and final CT as desired.

Some embodiments comprise a glass article, comprising a glass sheet with a front face having a width and a height, a back face opposite the front face, and a thickness between the front face and back face, forming four edges around the front and back faces, wherein the glass sheet comprises between about 50 mol % to about 90 mol % $SiO_2$, between about 0 mol % to about 20 mol % $Al_2O_3$, 0 mol % to about 20 mol % $B_2O_3$, and about 0 mol % to about 25 mol % $R_xO$, wherein R is any one or more of Li, Na, K, Rb, Cs and x is 2, or Zn, Mg, Ca, Sr or Ba and x is 1, and wherein the glass produces less than or equal to 2 dB/500 mm absorption. In further embodiments, $R_xO$—$Al_2O_3$>0; 0<$R_xO$—$Al_2O_3$<15; x=2 and $R_2O$—$Al_2O_3$<15; $R_2O$—$Al_2O_3$<2; x=2 and $R_2O$— $Al_2O_3$—MgO>-15; 0<($R_xO$—$Al_2O_3$)<25, -11<($R_2O$— $Al_2O_3$)<11, and -15<($R_2O$—$Al_2O_3$—MgO)<11; and/or -1< ($R_2O$—$Al_2O_3$)<2 and -6<($R_2O$—$Al_2O_3$—MgO)<1. In other embodiments, the glass article is a light guide plate. In some embodiments, a roughness of at least one face is less than 0.6 nm. In additional embodiments, the thickness of the plate is between about 0.5 mm and about 8 mm. In further embodiments, the thickness has a variation of less than 5%. In some embodiments, the light guide plate is manufactured from a fusion draw process, slot draw process, or a float process. In further embodiments, at least 10% of the iron is $Fe^{2+}$. In some embodiments, the glass article has a liquidus viscosity greater than 100 kP and a $T_{200P}$ temperature below 1760° C. In some embodiments, the glass comprises less than 1 ppm each of Co, Ni, and Cr. In some embodiments, the concentration of Fe is <about 50 ppm, <about 20 ppm, or <about 10 ppm. In other embodiments, Fe+30Cr+ 35Ni<about 60 ppm, Fe+30Cr+35Ni<about 40 ppm, Fe+30Cr+35Ni<about 20 ppm, or Fe+30Cr+35Ni<about 10 ppm. In some embodiments, at least one edge is a light injection edge (polished or unpolished) that scatters light within an angle less than 12.8 degrees full width half maximum (FWHM) in transmission. In some embodiments, the glass sheet further comprises a second edge adjacent to the light injection edge and a third edge opposite the second edge and adjacent to the light injection edge, wherein the second edge and the third edge scatter light within an angle of less than 12.8 degrees FWHM in reflection. The second edge and the third edge can have a diffusion angle in reflection that is below 6.4 degrees. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the density is between about 1.95 gm/cc @ 20 C to about 2.7 gm/cc @ 20 C, the Young's modulus is between about 62 GPa to about 90 GPa, and/or the CTE (0-300° C.) is between about $30 \times 10^{-7}$/° C. to about $95 \times 10^{-7}$/° C. In some embodiments, the glass sheet is chemically strengthened. In some embodiments, $T_{200P}$ temperature is below 1760° C., below 1730° C. or below 1700° C. In some embodiments, a liquidus viscosity can be greater than 100 kP or greater than 500 kP.

In additional embodiments, a glass article is provided comprising a glass sheet with a front face having a width and a height, a back face opposite the front face, and a thickness between the front face and back face, forming four edges around the front and back faces, wherein the glass sheet comprises between about 60 mol % to about 80 mol % $SiO_2$, between about 0.1 mol % to about 15 mol % $Al_2O_3$, 0 mol % to about 12 mol % $B_2O_3$, and about 0.1 mol % to about 15 mol % $R_2O$ and about 0.1 mol % to about 15 mol % RO, wherein R is any one or more of Li, Na, K, Rb, Cs and x is 2, or Zn, Mg, Ca, Sr or Ba and x is 1, and wherein the glass produces less than or equal to 2 dB/500 mm absorption. In some embodiments, Fe+30Cr+35Ni<about 60 ppm, Fe+30Cr+35Ni<about 40 ppm, Fe+30Cr+35Ni<about 30 ppm, or Fe+30Cr+35Ni<about 20 ppm. In some embodiments, 0<($R_xO$—$Al_2O_3$)<25, -11<($R_2O$—$Al_2O_3$)<11, and -15<($R_2O$—$Al_2O_3$—MgO)<11. In some embodiments, the glass produces less than or equal to 0.5 dB/500 mm absorption or less than or equal to 0.25 dB/500 mm absorption.

In further embodiments, a glass article is provided comprising a glass sheet having between about 50 mol % to about 90 mol % $SiO_2$, between about 0 mol % to about 15 mol % $Al_2O_3$, between about 0 mol % to about 12 mol % $B_2O_3$, and about 2 mol % to about 25 mol % $R_xO$, wherein R is any one or more of Li, Na, K, Rb, Cs and x is 2, or Zn, Mg, Ca, Sr or Ba and x is 1, and wherein Fe+30Cr+35Ni<about 60 ppm.

In additional embodiments, a light guide plate is provided comprising a glass sheet having between about 0 mol % to about 15 mol % $Al_2O_3$, and about 0 mol % to about 25 mol % $R_xO$, wherein R is any one or more of Li, Na, K, Rb, Cs and x is 2, or Zn, Mg, Ca, Sr or Ba and x is 1, and wherein Fe is <about 50 ppm. In some embodiments, the light guide plate further comprises between about 50 mol % to about 90 mol % $SiO_2$ and between about 0 mol % to about 12 mol % $B_2O_3$. In some embodiments, the glass comprises less than 1 ppm of each of Co, Ni, and Cr. In some embodiments, the glass produces less than or equal to 2 dB/500 mm of light attenuation, less than or equal to 1 dB/500 mm absorption, or less than or equal to 0.5 dB/500 mm absorption. In other embodiments, Fe+30Cr+35Ni<about 60 ppm or Fe+30Cr+35Ni<about 20 ppm. In some embodiments, the mol % of $Al_2O_3$ is < or substantially equal to the mol % $R_xO$; $R_xO$ $Al_2O_3$>0; 0<$R_xO$ $Al_2O_3$<25; x=2 and $R_2O$ $Al_2O_3$<15; $R_2O$ $Al_2O_3$<2; x=2 and $R_2O$—$Al_2O_3$—MgO>−15. In some embodiments, 0<($R_xO$—$Al_2O_3$)<25, −11<($R_2O$—$Al_2O_3$)<11, and −15<($R_2O$—$Al_2O_3$—MgO)<11. In some embodiments, −1<($R_2O$—$Al_2O_3$)<2 and −6<($R_2O$—$Al_2O_3$—MgO)<1. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the concentration of Fe is <about 20 ppm or the concentration of Fe is <about 10 ppm. In some embodiments, the glass sheet is chemically strengthened. In further embodiments, a display device comprises the light guide plate described above wherein the light guide plate further comprises a glass sheet with a front face having a width and a height, a back face opposite the front face, and a thickness between the front face and back face, forming four edges around the front and back faces, and wherein one or more edges of the light guide plate are illuminated by a light source. The light source can be selected from the group consisting of an LED, CCFL, OLED, and combinations thereof. The display device can have glass comprising less than 1 ppm of each of Co, Ni, and Cr. This glass can produce less than or equal to 2 dB/500 mm of light attenuation. In some embodiments, Fe+30Cr+35Ni<about 60 ppm and/or the mol % of $Al_2O_3$ is < or substantially equal to the mol % $R_xO$. In some embodiments, the thickness of the display device is less than 5 mm. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the concentration of Fe is <about 20 ppm.

In further embodiments, a glass article is provided comprising a glass sheet having between about 50 mol % to about 90 mol % $SiO_2$, between about 0 mol % to about 15 mol % $Al_2O_3$, between about 0 mol % to about 12 mol % $B_2O_3$, and about 2 mol % to about 25 mol % $R_xO$, wherein R is any one or more of Li, Na, K, Rb, Cs and x is 2, or Zn, Mg, Ca, Sr or Ba and x is 1, and wherein the glass produces 2 dB/500 mm or less of light attenuation in the glass sheet.

In additional embodiments, a display device is provided comprising a light guide plate comprising a glass sheet having a Young's modulus of between about 62 GPa to about 78 GPa, wherein the glass sheet comprises between about 0 mol % to about 15 mol % $Al_2O_3$ and about 2 mol % to about 25 mol % $R_xO$, wherein R is any one or more of Li, Na, K, Rb, Cs and x is 2, or Zn, Mg, Ca, Sr or Ba and x is 1, and wherein the transmittance of the glass sheet at 450 nm with at least 500 mm in length is greater than or equal to 85%, the transmittance of the glass sheet at 550 nm with at least 500 mm in length is greater than or equal to 90%, or the transmittance of the glass sheet at 630 nm with at least 500 mm in length is greater than or equal to 85%. In some embodiments, the concentration of Fe of the glass sheet is <about 50 ppm, <about 20 ppm or <about 10 ppm. In some embodiments, the thickness of the display device is less than 5 mm.

In further embodiments, a glass article is provided comprising a glass sheet having a Young's modulus of between about 62 GPa to about 78 GPa, wherein the glass sheet comprises between about 0 mol % to about 15 mol % $Al_2O_3$ and about 2 mol % to about 25 mol % $R_xO$, wherein R is any one or more of Li, Na, K, Rb, Cs and x is 2, or Zn, Mg, Ca, Sr or Ba, and x is 1, and wherein the transmittance of the glass sheet at 450 nm with at least 500 mm in length is greater than or equal to 85%, the transmittance of the glass sheet at 550 nm with at least 500 mm in length is greater than or equal to 90%, or the transmittance of the glass sheet at 630 nm with at least 500 mm in length is greater than or equal to 85%. In some embodiments, the concentration of Fe of the glass sheet is <about 50 ppm, <about 20 ppm, or <about 10 ppm. In some embodiments, the glass article is a light guide plate. In some embodiments, a display device can comprise the light guide plate described above wherein the light guide plate further comprises a glass sheet with a front face having a width and a height, a back face opposite the front face, and a thickness between the front face and back face, forming four edges around the front and back faces, and wherein one or more edges of the light guide plate are illuminated by a light source.

In additional embodiments, a glass article is provided comprising a glass sheet having between about 0 mol % to about 15 mol % $Al_2O_3$, and about 2 mol % to about 25 mol % $R_xO$, wherein R is any one or more of Li, Na, K, Rb, Cs and x is 2, or Zn, Mg, Ca, Sr or Ba and x is 1, wherein $R_xO$—$Al_2O_3$ is <25, and wherein the transmittance of the glass sheet at 450 nm with at least 500 mm in length is greater than or equal to 85%, the transmittance of the glass sheet at 550 nm with at least 500 mm in length is greater than or equal to 90%, or the transmittance of the glass sheet at 630 nm with at least 500 mm in length is greater than or equal to 85%. In some embodiments, the concentration of Fe of the glass sheet is <about 50 ppm, <about 20 ppm, or <about 10 ppm. In some embodiments, x=2 and $R_xO$—$Al_2O_3$<12; $R_xO$—$Al_2O_3$>0; $R_2O$—$Al_2O_3$<2; x=2 and wherein $R_2O$—$Al_2O_3$—MgO>−15; and/or 0<($R_xO$—$Al_2O_3$)<25, −11<($R_2O$—$Al_2O_3$)<11, and −15<($R_2O$—$Al_2O_3$—MgO)<11. In some embodiments, −1<($R_2O$—$Al_2O_3$)<2 and −6<($R_2O$—$Al_2O_3$—MgO)<1.

In further embodiments, a glass article is provided comprising a glass sheet having between about 50 mol % to about 90 mol % $SiO_2$, between about 0 mol % to about 15 mol % $Al_2O_3$, between about 0 mol % to about 12 mol % $B_2O_3$, and about 0 mol % to about 25 mol % $R_xO$, wherein R is any one or more of Li, Na, K, Rb, Cs and x is 2, or Zn, Mg, Ca, Sr or Ba and x is 1, wherein the glass produces 2 dB/500 mm or less of light attenuation in the glass sheet, and wherein 0<($R_xO$—$Al_2O_3$)<25, −11<($R_2O$—$Al_2O_3$)<11, and −15<($R_2O$—$Al_2O_3$—MgO)<11. In some embodiments, the concentration of Fe of the glass sheet is <about 50 ppm. In some embodiments, Fe+30Cr+35Ni<about 60 ppm.

Some embodiments provide a glass article, comprising a glass sheet with a front face having a width and a height, a back face opposite the front face, and a thickness between the front face and back face, forming four edges around the front and back faces, wherein the glass sheet comprises between about 50 mol % to about 90 mol % $SiO_2$, between about 0 mol % to about 20 mol % $Al_2O_3$, 0 mol % to about 20 mol % $B_2O_3$, and about 0 mol % to about 19 mol % $R_xO$, wherein R is any one or more of Li, Na, K, Rb, Cs and x is 2, or Zn, Mg, Ca, Sr or Ba and x is 1, and wherein the glass produces less than or equal to 2 dB/500 mm absorption. This glass article can include $R_xO-Al_2O_3>0$. This glass article can include $0<R_xO-Al_2O_3<15$. This glass article can include x=2 and wherein $R_2O-Al_2O_3<15$. This glass article can include $R_2O-Al_2O_3<2$. This glass article can include x=2 and wherein $R_2O-Al_2O_3-MgO>-10$. This glass article can include $0<(R_xO-Al_2O_3)<12$, $-1<(R_2O-Al_2O_3)<11$, and $-10<(R_2O-Al_2O_3-MgO)<11$. This glass article can include $-1<(R_2O-Al_2O_3)<2$ and $-6<(R_2O-Al_2O_3-MgO)<1$. This glass article can be a light guide plate. This glass article can include a roughness of at least one face is less than 0.6 nm. This glass article can include a thickness of the plate between about 0.5 mm and about 8 mm. This glass article can include a thickness having a variation of less than 5%. This glass article can include a light guide plate manufactured from a fusion draw process, slot draw process, or a float process. This glass article can include at least 10% of the iron is $Fe^{2+}$. This glass article can include a liquidus viscosity greater than 100 kP and a $T_{200P}$ temperature below 1760° C. This glass article can include less than 1 ppm each of Co, Ni, and Cr. This glass article can include a concentration of Fe is <about 50 ppm. This glass article can include a concentration of Fe is <about 20 ppm. This glass article can include a concentration of Fe is <about 10 ppm. This glass article can include Fe+30Cr+35Ni<about 60 ppm. This glass article can include Fe+30Cr+35Ni<about 40 ppm. This glass article can include Fe+30Cr+35Ni<about 20 ppm. This glass article can include Fe+30Cr+35Ni<about 10 ppm. This glass article can include at least one edge being a light injection edge that scatters light within an angle less than 12.8 degrees full width half maximum (FWHM) in transmission. This glass article can include a light injection edge that is unpolished. This glass article can include a second edge adjacent to the light injection edge and a third edge opposite the second edge and adjacent to the light injection edge, wherein the second edge and the third edge scatter light within an angle of less than 12.8 degrees FWHM in reflection. This glass article can include a second edge and third edge having a diffusion angle in reflection that is below 6.4 degrees. This glass article can include a transmittance at 450 nm with at least 500 mm in length is greater than or equal to 85%, a transmittance at 550 nm with at least 500 mm in length is greater than or equal to 90%, or a transmittance at 630 nm with at least 500 mm in length is greater than or equal to 85%, and combinations thereof. This glass article can include a density is between about 1.95 gm/cc @ 20 C to about 2.7 gm/cc @ 20 C. This glass article can include a Young's modulus between about 62 GPa to about 90 GPa. This glass article can include a CTE (0-300° C.) between about $30\times10^{-7}/°$ C. to about $95\times10^{-7}/°$ C. This glass article can include a density between about 1.95 gm/cc @ 20 C to about 2.7 gm/cc @ 20 C, a Young's modulus between about 62 GPa to about 90 GPa, and CTE (0-300° C.) between about $30\times10^{-7}/°$ C. to about $95\times10^{-7}/°$ C. This glass article can be chemically strengthened.

Further embodiments include a glass article, comprising a glass sheet with a front face having a width and a height, a back face opposite the front face, and a thickness between the front face and back face, forming four edges around the front and back faces, wherein the glass sheet comprises between about 60 mol % to about 80 mol % $SiO_2$, between about 0.1 mol % to about 15 mol % $Al_2O_3$, 0 mol % to about 10 mol % $B_2O_3$, and about 0.1 mol % to about 15 mol % $R_2O$ and about 0.1 mol % to about 12 mol % RO, wherein R is any one or more of Li, Na, K, Rb, Cs and x is 2, or Zn, Mg, Ca, Sr or Ba and x is 1, and wherein the glass produces less than or equal to 2 dB/500 mm absorption. This glass article can include Fe+30Cr+35Ni<about 60 ppm. This glass article can include Fe+30Cr+35Ni<about 40 ppm. This glass article can include Fe+30Cr+35Ni<about 30 ppm. This glass article can include Fe+30Cr+35Ni< about 20 ppm. This glass article can include $0<(R_xO-Al_2O_3)<12$, $-2<(R_2O-Al_2O_3)<11$, and $-10<(R_2O-Al_2O_3-MgO)<11$. This glass article can produce less than or equal to 0.5 dB/500 mm absorption. This glass article can produce less than or equal to 0.25 dB/500 mm absorption.

Additional embodiments include a glass article comprising a glass sheet having between about 50 mol % to about 90 mol % $SiO_2$, between about 0 mol % to about 15 mol % $Al_2O_3$, between about 0 mol % to about 10 mol % $B_2O_3$, and about 2 mol % to about 19 mol % $R_xO$, wherein R is any one or more of Li, Na, K, Rb, Cs and x is 2, or Zn, Mg, Ca, Sr or Ba and x is 1, and wherein Fe+30Cr+35Ni<about 60 ppm.

Further embodiments include a light guide plate, comprising a glass sheet having between about 0 mol % to about 15 mol % $Al_2O_3$, and about 0 mol % to about 19 mol % $R_xO$, wherein R is any one or more of Li, Na, K, Rb, Cs and x is 2, or Zn, Mg, Ca, Sr or Ba and x is 1, and wherein Fe is <about 50 ppm. This light guide plate can include between about 50 mol % to about 90 mol % $SiO_2$ and between about 0 mol % to about 10 mol % $B_2O_3$. This light guide plate can include less than 1 ppm of each of Co, Ni, and Cr. This light guide plate can produce less than or equal to 2 dB/500 mm of light attenuation. This light guide plate can produce less than or equal to 1 dB/500 mm absorption. This light guide plate can produce less than or equal to 0.5 dB/500 mm absorption. This light guide plate can include Fe+30Cr+35Ni<about 60 ppm. This light guide plate can include Fe+30Cr+35Ni<about 20 ppm. This light guide plate can include the mol % of $Al_2O_3$ is < or substantially equal to the mol % $R_xO$. This light guide plate can include $R_xO-Al_2O_3>0$. This light guide plate can include $0<R_xO-Al_2O_3<15$. This light guide plate can include x=2 and wherein $R_2O-Al_2O_3<15$. This light guide plate can include $R_2O-Al_2O_3<2$. This light guide plate can include x=2 and wherein $R_2O-Al_2O_3-MgO>-10$. This light guide plate can include $0<(R_xO-Al_2O_3)<12$, $-1<(R_2O-Al_2O_3)<11$, and $-10<(R_2O-Al_2O_3-MgO)<11$. This light guide plate can include $-1<(R_2O-Al_2O_3)<2$ and $-6<(R_2O-Al_2O_3-MgO)<1$. This light guide plate can include a transmittance at 450 nm with at least 500 mm in length is greater than or equal to 85%, a transmittance at 550 nm with at least 500 mm in length is greater than or equal to 90%, or a transmittance at 630 nm with at least 500 mm in length is greater than or equal to 85%, and combinations thereof. This light guide plate can include a concentration of Fe is <about 20 ppm. This light guide plate can include a concentration of Fe is <about 10 ppm. This light guide plate can be chemically strengthened. In additional embodiments, a display device comprising the light guide plate above wherein the light guide plate further comprises a glass sheet with a front face having a width and a height, a back face opposite the front face, and a thickness between the front face and back face, forming four edges around the front and back faces, and wherein one or more edges of the light guide plate are illuminated by a light source. This display device can include a light source selected from the group consisting of an LED, CCFL, OLED, and combinations thereof. This display device can include glass comprising less than 1 ppm of each of Co, Ni, and Cr. This display device can produce less than or equal to 2 dB/500 mm of light attenuation. This display device can include Fe+30Cr+35Ni<about 60 ppm. This display device can include the mol % of $Al_2O_3$ is < or substantially equal to the mol % $R_xO$. This display device can include a thickness of less than 5 mm. This display device can include a transmittance at 450 nm with at least 500 mm in length is greater than or equal to 85%, a transmittance at 550 nm with at least 500 mm in length is greater than or equal to 90%, or a transmittance at 630 nm with at least 500 mm in length is greater than or equal to 85%, and combinations thereof. This display device can include a concentration of Fe is <about 20 ppm.

In some embodiments, a glass article is provided comprising a glass sheet having between about 50 mol % to about 90 mol % $SiO_2$, between about 0 mol % to about 15 mol % $Al_2O_3$, between about 0 mol % to about 10 mol % $B_2O_3$, and about 2 mol % to about 19 mol % $R_xO$, wherein R is any one or more of Li, Na, K, Rb, Cs and x is 2, or Zn, Mg, Ca, Sr or Ba and x is 1, and wherein the glass produces 2 dB/500 mm or less of light attenuation in the glass sheet.

In other embodiments, a display device is provided comprising a light guide plate comprising a glass sheet having a Young's modulus of between about 62 GPa to about 78 GPa, wherein the glass sheet comprises between about 0 mol % to about 15 mol % $Al_2O_3$ and about 2 mol % to about 19 mol % $R_xO$, wherein R is any one or more of Li, Na, K, Rb, Cs and x is 2, or Zn, Mg, Ca, Sr or Ba and x is 1, and wherein the transmittance of the glass sheet at 450 nm with at least 500 mm in length is greater than or equal to 85%, the transmittance of the glass sheet at 550 nm with at least 500 mm in length is greater than or equal to 90%, or the transmittance of the glass sheet at 630 nm with at least 500 mm in length is greater than or equal to 85%. This display device can include a concentration of Fe of the glass sheet is <about 50 ppm. This display device can include a concentration of Fe of the glass sheet is <about 20 ppm. This display device can include a concentration of Fe of the glass sheet is <about 10 ppm. This display device can include a thickness less than 5 mm.

In some embodiments, a glass article is provided comprising a glass sheet having a Young's modulus of between about 62 GPa to about 78 GPa, wherein the glass sheet comprises between about 0 mol % to about 15 mol % $Al_2O_3$ and about 2 mol % to about 19 mol % $R_xO$, wherein R is any one or more of Li, Na, K, Rb, Cs and x is 2, or Zn, Mg, Ca, Sr or Ba, and x is 1, and wherein the transmittance of the glass sheet at 450 nm with at least 500 mm in length is greater than or equal to 85%, the transmittance of the glass sheet at 550 nm with at least 500 mm in length is greater than or equal to 90%, or the transmittance of the glass sheet at 630 nm with at least 500 mm in length is greater than or equal to 85%. This glass article can include a concentration of Fe of the glass sheet is <about 50 ppm. This glass article can include a concentration of Fe of the glass sheet is <about 20 ppm. This glass article can include a concentration of Fe of the glass sheet is <about 10 ppm. This glass article can be a light guide plate. In other embodiments, a display device comprising the light guide plate describe above wherein the light guide plate further comprises a glass sheet with a front face having a width and a height, a back face opposite the front face, and a thickness between the front face and back face, forming four edges around the front and back faces, and wherein one or more edges of the light guide plate are illuminated by a light source.

In further embodiments a glass article is provided comprising a glass sheet having between about 0 mol % to about 15 mol % $Al_2O_3$, and about 2 mol % to about 19 mol % $R_xO$, wherein R is any one or more of Li, Na, K, Rb, Cs and x is 2, or Zn, Mg, Ca, Sr or Ba and x is 1, wherein $R_xO$—$Al_2O_3$ is <15, and wherein the transmittance of the glass sheet at 450 nm with at least 500 mm in length is greater than or equal to 85%, the transmittance of the glass sheet at 550 nm with at least 500 mm in length is greater than or equal to 90%, or the transmittance of the glass sheet at 630 nm with at least 500 mm in length is greater than or equal to 85%. This glass article can include a concentration of Fe of the glass sheet is <about 50 ppm. This glass article can include a concentration of Fe of the glass sheet is <about 20 ppm. This glass article can include a concentration of Fe of the glass sheet is <about 10 ppm. This glass article can include x=2 and $R_xO$—$Al_2O_3$<12. This glass article can include $R_xO$—$Al_2O_3$>0. This glass article can include $R_2O$—$Al_2O_3$<2. This glass article can include x=2 and wherein $R_2O$—$Al_2O_3$—MgO>−10. This glass article can include 0<($R_xO$—$Al_2O_3$)<12, −1<($R_2O$—$Al_2O_3$)<11, and −10<($R_2O$—$Al_2O_3$—MgO)<11. This glass article can include −1<($R_2O$—$Al_2O_3$)<2 and −6<($R_2O$—$Al_2O_3$—MgO)<1.

In additional embodiments, a glass article is provided comprising a glass sheet having between about 50 mol % to about 90 mol % $SiO_2$, between about 0 mol % to about 15 mol % $Al_2O_3$, between about 0 mol % to about 10 mol % $B_2O_3$, and about 0 mol % to about 19 mol % $R_xO$, wherein R is any one or more of Li, Na, K, Rb, Cs and x is 2, or Zn, Mg, Ca, Sr or Ba and x is 1, wherein the glass produces 2 dB/500 mm or less of light attenuation in the glass sheet, and wherein 0<($R_xO$—$Al_2O_3$)<12, −2<($R_2O$—$Al_2O_3$)<11, and −10<($R_2O$—$Al_2O_3$—MgO)<11. This glass article can include a concentration of Fe of the glass sheet is <about 50 ppm. This glass article can include Fe+30Cr+35Ni<about 60 ppm. This glass article can include a $T_{200P}$ temperature below 1760° C. This glass article can include a $T_{200P}$ temperature below 1730° C. This glass article can include a $T_{200P}$ temperature below 1700° C. This glass article can include a liquidus viscosity greater than 100 kP. This glass article can include a liquidus viscosity greater than 500 kP.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a ring" includes examples having two or more such rings unless the context clearly indicates otherwise. Likewise, a "plurality" or an "array" is intended to denote "more than one." As such, a "plurality of droplets" includes two or more such droplets, such as three or more such droplets, etc., and an "array of rings" comprises two or more such droplets, such as three or more such rings, etc.

Ranges can be expressed herein as from "about" one particular value, and/or to "about" another particular value. When such a range is expressed, examples include from the one particular value and/or to the other particular value.

Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

EXAMPLES

The following examples are set forth below to illustrate the methods and results according to the disclosed subject matter. These examples are not intended to be inclusive of all embodiments of the subject matter disclosed herein, but rather to illustrate representative methods and results. These examples are not intended to exclude equivalents and variations of the present disclosure which are apparent to one skilled in the art.

Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. The compositions themselves are given in mole percent on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

The glass properties set forth in Table 1 were determined in accordance with techniques conventional in the glass art. Thus, the linear coefficient of thermal expansion (CTE) over the temperature range 25-300° C. is expressed in terms of ×10-7/° C. and the annealing point is expressed in terms of ° C. These were determined from fiber elongation techniques (ASTM references E228-85 and C336, respectively). The density in terms of grams/cm3 was measured via the Archimedes method (ASTM C693). The melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81).

The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus of the glass (for the corresponding test period). Testing is sometimes carried out at longer times (e.g. 72 hours), to observe slower growing phases. The liquidus viscosity in poises was determined from the liquidus temperature and the coefficients of the Fulcher equation. If included, Young's modulus values in terms of GPa were determined using a resonant ultrasonic spectroscopy technique of the general type set forth in ASTM E1875-00e1.

The exemplary glasses of Table 1 were prepared using a commercial sand as a silica source, milled such that 90% by weight passed through a standard U.S. 100 mesh sieve. Alumina was the alumina source, periclase was the source for MgO, limestone the source for CaO, strontium carbonate, strontium nitrate or a mix thereof was the source for SrO, barium carbonate was the source for BaO, and tin (IV) oxide was the source for SnO2. The raw materials were thoroughly mixed, loaded into a platinum vessel suspended in a furnace heated by silicon carbide glowbars, melted and stirred for several hours at temperatures between 1600 and 1650° C. to ensure homogeneity, and delivered through an orifice at the base of the platinum vessel. The resulting patties of glass were annealed at or near the annealing point, and then subjected to various experimental methods to determine physical, viscous and liquidus attributes.

These methods are not unique, and the glasses of Table 1 can be prepared using standard methods well-known to those skilled in the art. Such methods include a continuous melting process, such as would be performed in a continuous melting process, wherein the melter used in the continuous melting process is heated by gas, by electric power, or combinations thereof.

Raw materials appropriate for producing exemplary glasses include commercially available sands as sources for $SiO_2$; alumina, aluminum hydroxide, hydrated forms of alumina, and various aluminosilicates, nitrates and halides as sources for $Al_2O_3$; boric acid, anhydrous boric acid and boric oxide as sources for B2O3; periclase, dolomite (also a source of CaO), magnesia, magnesium carbonate, magnesium hydroxide, and various forms of magnesium silicates, aluminosilicates, nitrates and halides as sources for MgO; limestone, aragonite, dolomite (also a source of MgO), wolastonite, and various forms of calcium silicates, aluminosilicates, nitrates and halides as sources for CaO; and oxides, carbonates, nitrates and halides of strontium and barium. If a chemical fining agent is desired, tin can be added as SnO2, as a mixed oxide with another major glass component (e.g., CaSnO3), or in oxidizing conditions as SnO, tin oxalate, tin halide, or other compounds of tin known to those skilled in the art.

The glasses in Table 1 contain SnO2 as a fining agent, but other chemical fining agents could also be employed to obtain glass of sufficient quality for TFT substrate applications. For example, exemplary glasses could employ any one or combinations of As2O3, Sb2O3, CeO2, Fe2O3, and halides as deliberate additions to facilitate fining, and any of these could be used in conjunction with the SnO2 chemical fining agent shown in the examples. Of these, As2O3 and Sb2O3 are generally recognized as hazardous materials, subject to control in waste streams such as might be generated in the course of glass manufacture or in the processing of TFT panels. It is therefore desirable to limit the concentration of As2O3 and Sb2O3 individually or in combination to no more than 0.005 mol %.

In addition to the elements deliberately incorporated into exemplary glasses, nearly all stable elements in the periodic table are present in glasses at some level, either through low levels of contamination in the raw materials, through high-temperature erosion of refractories and precious metals in the manufacturing process, or through deliberate introduction at low levels to fine tune the attributes of the final glass. For example, zirconium may be introduced as a contaminant via interaction with zirconium-rich refractories. As a further example, platinum and rhodium may be introduced via interactions with precious metals. As a further example, iron may be introduced as a tramp in raw materials, or deliberately added to enhance control of gaseous inclusions. As a further example, manganese may be introduced to control color or to enhance control of gaseous inclusions. As a further example, alkalis may be present as a tramp component at levels up to about 0.1 mol % for the combined concentration of Li2O, Na2O and K2O.

Hydrogen is inevitably present in the form of the hydroxyl anion, OH—, and its presence can be ascertained via standard infrared spectroscopy techniques. Dissolved hydroxyl ions significantly and nonlinearly impact the annealing point of exemplary glasses, and thus to obtain the desired annealing point it may be necessary to adjust the concentrations of major oxide components so as to compensate. Hydroxyl ion concentration can be controlled to some extent through choice of raw materials or choice of melting system. For example, boric acid is a major source of hydroxyls, and replacing boric acid with boric oxide can be a useful means to control hydroxyl concentration in the final glass. The same reasoning applies to other potential raw materials comprising hydroxyl ions, hydrates, or compounds comprising physisorbed or chemisorbed water molecules. If burners are used in the melting process, then hydroxyl ions can also be introduced through the combustion products from combustion of natural gas and related hydrocarbons, and thus it may be desirable to shift the energy used in melting from burners to electrodes to compensate. Alternatively, one might instead employ an iterative process of adjusting major oxide components so as to compensate for the deleterious impact of dissolved hydroxyl ions.

Sulfur is often present in natural gas, and likewise is a tramp component in many carbonate, nitrate, halide, and oxide raw materials. In the form of SO2, sulfur can be a troublesome source of gaseous inclusions. The tendency to form SO2-rich defects can be managed to a significant degree by controlling sulfur levels in the raw materials, and by incorporating low levels of comparatively reduced multivalent cations into the glass matrix. While not wishing to be bound by theory, it appears that SO2-rich gaseous inclusions arise primarily through reduction of sulfate (SO4=) dissolved in the glass. The elevated barium concentrations of exemplary glasses appear to increase sulfur retention in the glass in early stages of melting, but as noted above, barium is required to obtain low liquidus temperature, and hence high T35k-Tliq and high liquidus viscosity. Deliberately controlling sulfur levels in raw materials to a low level is a useful means of reducing dissolved sulfur (presumably as sulfate) in the glass. In particular, sulfur is preferably less than 200 ppm by weight in the batch materials, and more preferably less than 100 ppm by weight in the batch materials.

Reduced multivalents can also be used to control the tendency of exemplary glasses to form SO2 blisters. While not wishing to be bound to theory, these elements behave as potential electron donors that suppress the electromotive force for sulfate reduction. Sulfate reduction can be written in terms of a half reaction such as

where e− denotes an electron. The "equilibrium constant" for the half reaction is Keq=[SO2][O2][e−]2/[SO4=]

where the brackets denote chemical activities. Ideally one would like to force the reaction so as to create sulfate from SO2, O2 and 2e−. Adding nitrates, peroxides, or other oxygen-rich raw materials may help, but also may work against sulfate reduction in the early stages of melting, which may counteract the benefits of adding them in the first place. SO2 has very low solubility in most glasses, and so is impractical to add to the glass melting process. Electrons may be "added" through reduced multivalents. For example, an appropriate electron-donating half reaction for ferrous iron (Fe2+) is expressed as

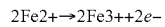

This "activity" of electrons can force the sulfate reduction reaction to the left, stabilizing SO4=in the glass. Suitable reduced multivalents include, but are not limited to, Fe2+, Mn2+, Sn2+, Sb3+, As3+, V3+, Ti3+, and others familiar to those skilled in the art. In each case, it may be important to minimize the concentrations of such components so as to avoid deleterious impact on color of the glass, or in the case of As and Sb, to avoid adding such components at a high enough level so as to complication of waste management in an end-user's process.

In addition to the major oxides components of exemplary glasses, and the minor or tramp constituents noted above, halides may be present at various levels, either as contaminants introduced through the choice of raw materials, or as deliberate components used to eliminate gaseous inclusions in the glass. As a fining agent, halides may be incorporated at a level of about 0.4 mol % or less, though it is generally desirable to use lower amounts if possible to avoid corrosion of off-gas handling equipment. In some embodiments, the concentrations of individual halide elements are below about 200 ppm by weight for each individual halide, or below about 800 ppm by weight for the sum of all halide elements.

In addition to these major oxide components, minor and tramp components, multivalents and halide fining agents, it may be useful to incorporate low concentrations of other colorless oxide components to achieve desired physical, optical or viscoelastic properties. Such oxides include, but are not limited to, $TiO_2$, $ZrO_2$, $HfO_2$, $Nb_2O_5$, $Ta_2O_5$, $MoO_3$, $WO_3$, $ZnO$, $In_2O_3$, $Ga_2O_3$, $Bi_2O_3$, $GeO_2$, $PbO$, $SeO_3$, $TeO_2$, $Y_2O_3$, $La_2O_3$, $Gd_2O_3$, and others known to those skilled in the art. Through an iterative process of adjusting the relative proportions of the major oxide components of exemplary glasses, such colorless oxides can be added to a level of up to about 2 mol % without unacceptable impact to annealing point, T35k-Tliq or liquidus viscosity.

Table 6 shows examples of glasses (samples 1-69) with high transmissibility as described herein.

TABLE 6

|  | 1 | 2 | 3 | 4 | 5 | 6 | 7 |
|---|---|---|---|---|---|---|---|
| SiO2 | 74.79 | 66.86 | 66.47 | 69.7 | 70.92 | 68.92 | 70.23 |
| Al2O3 | 7.7 | 11.97 | 11.16 | 8.97 | 8 | 11.68 | 9.95 |
| B2O3 | 0.93 | 7.16 | 9.28 | 10.21 | 10.98 | 4.69 | 8.36 |
| Li2O | 0 | 0 | 0 | 0 | 0 | 0 | 0 |
| Na2O | 12.16 | 11.32 | 10.3 | 8.4 | 7.41 | 12.03 | 9.08 |
| K2O | 0.01 | 0.01 | 0.67 | 0.01 | 0.01 | 0.01 | 2.26 |
| MgO | 4.16 | 2.5 | 1.03 | 2.53 | 2.51 | 2.49 | 0.03 |
| CaO | 0 | 0.04 | 0.92 | 0.04 | 0.04 | 0.04 | 0.03 |
| SrO | 0 | 0 | 0 | 0 | 0 | 0 | 0 |
| BaO | 0 | 0 | 0 | 0 | 0 | 0 | 0 |
| SnO2 | 0.19 | 0.1 | 0.1 | 0.1 | 0.09 | 0.1 | 0.02 |
| Fe2O3 | 0.05 | 0.05 | 0.05 | 0.05 | 0.05 | 0.05 | 0.02 |
| ZrO2 | 0.00 | 0.00 | 0.02 | 0.00 | 0.00 | 0 | 0.02 |
| RxO—Al2O3 | 8.6 | 1.9 | 1.8 | 2.0 | 2.0 | 2.89 | 1.5 |
| R2O—Al2O3 | 4.5 | −0.6 | −0.2 | −0.6 | −0.6 | 0.36 | 1.4 |
| R2O—(Al2O3 + MgO) | 0 | −3 | −1 | −3 | −3 | −2.13 | 1 |
| strain |  | 553.2 | 523.8 | 529.5 | 523.9 | 567.8 |  |
| anneal |  | 607.4 | 575.2 | 582.9 | 577.3 | 621.6 |  |
| soft |  | 885.5 | 848.2 | 872.3 | 868 | 913.3 | 822.8 |
| CTE |  | 65.2 | 66.3 | 54.7 | 51 | 68.6 | 70 |
| density |  | 2.366 | 2.357 | 2.312 | 2.295 | 2.382 | 2.34 |
| A |  | −3.3E+00 | −2.6E+00 | −2.7E+00 | −2.7E+00 | −3.038 | −3.5E+00 |
| B |  | 9.1E+03 | 8.0E+03 | 8.5E+03 | 8.6E+03 | 8948.7 | 1.1E+04 |
| To |  | 50 | 67.4414 | 47.4 | 36.6 | 66.9 | −246.1 |
| T(200P) |  | 1689 | 1690 | 1732 | 1748 | 1743 | 1747 |
| 72 hr gradient boat int |  |  |  |  |  | 1050 |  |
| int liq visc |  |  |  |  |  |  |  |

|  | 8 | 9 | 10 | 11 | 12 | 13 | 14 |
|---|---|---|---|---|---|---|---|
| SiO2 | 68.64 | 68.6 | 72.29 | 65.79 | 77.7 | 70.26 | 70.93 |
| Al2O3 | 9.1 | 9.15 | 9.33 | 11.1 | 6 | 8.66 | 8.63 |
| B2O3 | 11.16 | 11.13 | 1.84 | 7.11 | 0 | 7.59 | 7.58 |
| Li2O | 0 | 0 | 0 | 0 | 0 | 0 | 0 |
| Na2O | 8.69 | 8.67 | 12.62 | 10.17 | 16.1 | 7.79 | 8.08 |
| K2O | 0.56 | 0.56 | 0.01 | 0.67 | 0.01 | 1.16 | 0.76 |
| MgO | 0.89 | 0.88 | 3.69 | 2.53 | 0.01 | 2.26 | 2.28 |
| CaO | 0.79 | 0.03 | 0 | 0.04 | 0.02 | 0.04 | 0.04 |
| SrO | 0 | 0.8 | 0 | 2.43 | 0 | 2.09 | 1.56 |
| BaO | 0 | 0 | 0 | 0 | 0 | 0 | 0 |
| SnO2 | 0.1 | 0.1 | 0.18 | 0.09 | 0.1 | 0.07 | 0.07 |
| Fe2O3 | 0.05 | 0.05 | 0.05 | 0.05 | 0.05 | 0.05 | 0.05 |
| ZrO2 | 0.02 | 0.02 | 0.00 | 0.02 | 0.00 | 0.02 | 0.02 |
| RxO—Al2O3 | 1.8 | 1.8 | 7.0 | 4.7 | 10.1 | 4.7 | 4.1 |
| R2O—Al2O3 | 0.2 | 0.1 | 3.3 | −0.3 | 10.1 | 0.3 | 0.2 |
| R2O—(Al2O3 + MgO) | −1 | −1 | 0 | −3 | 10 | −2 | −2 |
| strain | 508.3 | 510.1 | 538.1 | 482.1 | 536.5 | 537.8 |  |
| anneal | 557.7 | 560.6 | 584.7 | 527.2 | 585 | 587.6 |  |
| soft | 824.4 | 831.2 | 828.6 | 747.6 | 832.3 | 852.7 |  |
| CTE | 60.4 | 60.5 | 68 | 81 | 61.3 | 59.2 |  |
| density | 2.324 | 2.336 | 2.439 | 2.398 | 2.402 | 2.382 |  |
| A | −2.3E+00 | −2.3E+00 | −2.3E+00 | −1.3E+00 | −1.9E+00 | −2.2E+00 |  |
| B | 7.7E+03 | 7.6E+03 | 6.9E+03 | 5.1E+03 | 6.5E+03 | 7.2E+03 |  |
| To | 57.5 | 65.4 | 138.2 | 1.7E+02 | 152.4 | 115.6 |  |
| T(200P) | 1730 | 1722 | 1632 | 1613 | 1701 | 1732 |  |
| 72 hr gradient boat int | 810 | 750 | 1000 |  | 925 | 960 |  |
| int liq visc | 83904910 | 683403477 |  |  | 3295637 | 2421850 |  |

|  | 15 | 16 | 17 | 18 | 19 | 20 | 21 |
|---|---|---|---|---|---|---|---|
| SiO2 | 68.54 | 65.83 | 68.72 | 68.69 | 71.02 | 76.17 | 68.62 |
| Al2O3 | 10.32 | 12.93 | 9.13 | 10.07 | 6.42 | 6.91 | 10.28 |
| B2O3 | 7.24 | 6.19 | 7.21 | 9.12 | 7.42 | 5.89 | 7.17 |
| Li2O | 0 | 0 | 0 | 0 | 0 | 0 | 0 |

TABLE 6-continued

|  |  |  |  |  |  |  |  |
|---|---|---|---|---|---|---|---|
| Na2O | 9.87 | 12.32 | 10.17 | 9.44 | 5.68 | 10.85 | 9.85 |
| K2O | 0.26 | 0.01 | 0.63 | 0.56 | 2.28 | 0.01 | 0.26 |
| MgO | 2.99 | 2.54 | 3.04 | 1.02 | 2 | 0 | 0.72 |
| CaO | 0.62 | 0.04 | 0.92 | 0.93 | 0.03 | 0.02 | 2.95 |
| SrO | 0 | 0 | 0 | 0 | 4.17 | 0 | 0 |
| BaO | 0 | 0 | 0 | 0 | 0 | 0 | 0 |
| SnO2 | 0.09 | 0.1 | 0.09 | 0.1 | 0.91 | 0.1 | 0.08 |
| Fe2O3 | 0.05 | 0.05 | 0.05 | 0.05 | 0.05 | 0.05 | 0.05 |
| ZrO2 | 0.02 | 0.00 | 0.02 | 0.02 | 0.02 | 0.00 | 0.02 |
| RxO—Al2O3 | 3.4 | 2.0 | 5.6 | 1.9 | 7.7 | 4.0 | 3.5 |
| R2O—Al2O3 | −0.2 | −0.6 | 1.7 | −0.1 | 1.5 | 4.0 | −0.2 |
| R2O—(Al2O3 + MgO) | −3 | −3 | −1 | −1 | 0 | 4 | −1 |
| strain | 547.5 | 562.3 | 531.6 | 52.4 | 541.6 | 539.1 | 544.2 |
| anneal | 598.2 | 614.8 | 578.1 | 576.2 | 587.2 | 584.8 | 592.4 |
| soft | 872.6 | 896.7 | 823 | 859 | 798.7 | 804.3 | 838.4 |
| CTE | 62.9 | 69.6 | 66.6 | 62.5 | 60.1 | 62.1 | 63.4 |
| density | 2.364 | 2.383 | 2.382 | 2.343 | 2.458 | 2.374 | 2.385 |
| A | −2.8E+00 | −3.3E+00 | −1.9E+00 | −2.7E+00 | −1.4E+00 | −6.7E−01 | −2.0E+00 |
| B | 8.4E+03 | 9.1E+03 | 6.4E+03 | 8.5E+03 | 5.2E+03 | 4.4E+03 | 6.7E+03 |
| To | 67.1 | 58.8 | 152.3 | 36.4 | 233.6 | 275.0909 | 153.8 |
| T(200P) | 1721 | 1680 | 1671 | 1731 | 1646 | 1744 | 1702 |
| 72 hr gradient boat int | 1070 |  | 965 | 810 |  |  | 960 |
| int liq visc | 407671 |  |  |  |  |  | 1810825 |

|  | 22 | 23 | 24 | 25 | 26 | 27 | 28 |
|---|---|---|---|---|---|---|---|
| SiO2 | 68.75 | 70.31 | 70.93 | 77.13 | 74.28 | 72.22 | 65.33 |
| Al2O3 | 10.1 | 8.68 | 8.67 | 6.01 | 5.06 | 7.62 | 13.65 |
| B2O3 | 7.36 | 9.51 | 7.52 | 0 | 3.71 | 7.58 | 5 |
| Li2O | 0 | 0 | 0 | 0 | 0 | 0 | 0 |
| Na2O | 9.41 | 7.81 | 8.79 | 11.76 | 4.17 | 8.08 | 13.34 |
| K2O | 0.56 | 1.16 | 0.01 | 0.01 | 0.99 | 0.01 | 0 |
| MgO | 1.01 | 1.24 | 2.32 | 4.84 | 6.05 | 2.22 | 2.5 |
| CaO | 0.64 | 0.03 | 0.04 | 0 | 0.06 | 0.03 | 0.03 |
| SrO | 2.01 | 1.11 | 1.57 | 0 | 5.52 | 2.09 | 0 |
| BaO | 0 | 0 | 0 | 0 | 0 | 0 | 0 |
| SnO2 | 0.09 | 0.08 | 0.08 | 0.2 | 0.09 | 0.08 | 0.07 |
| Fe2O3 | 0.05 | 0.05 | 0.05 | 0.05 | 0.05 | 0.05 | 0.05 |
| ZrO2 | 0.02 | 0.02 | 0.02 | 0.00 | 0.02 | 0.02 | 0.02 |
| RxO—Al2O3 | 3.5 | 2.7 | 4.1 | 10.6 | 11.7 | 4.8 | 2.2 |
| R2O—Al2O3 | −0.1 | 0.3 | 0.1 | 5.8 | 0.1 | 0.5 | −0.3 |
| R2O—(Al2O3 + MgO) | −1 | −1 | −2 | 1 | −6 | −2 | −3 |
| strain | 539.5 | 519.4 | 542.5 |  | 582.4 | 540.8 | 569.3 |
| anneal | 588 | 568.4 | 591.4 |  | 631.6 | 589.1 | 624.2 |
| soft | 64.4 | 828.4 | 859.5 | 873 | 836.2 | 904.1 |  |
| CTE | 834.7 | 59.7 | 58.2 | 52.1 | 55.7 | 72.8 |  |
| density | 2.415 | 2.353 | 2.382 | 2.491 | 2.389 | 2.397 |  |
| A | −2.0E+00 | −1.9E+00 | −2.1E+00 | −2.1E+00 | −1.6E+00 | −3.4E+00 |  |
| B | 6.6E+03 | 6.8E+03 | 7.0E+03 | 6.4E+03 | 6.2E+03 | 9.2E+03 |  |
| To | 150.8 | 111.1 | 133.5 | 212.7 | 174.5 | 67.9 |  |
| T(200P) | 1701 | 1741 | 1731 | 1676 | 1738 | 1676 |  |
| 72 hr gradient boat int | 1010 | 830 | 980 |  | 1075 | 915 | 1020 |
| int liq visc |  | 41951074 | 1518435 |  | 4822146 |  |  |

|  | 29 | 30 | 31 | 32 | 33 | 34 | 35 |
|---|---|---|---|---|---|---|---|
| SiO2 | 68.94 | 70.14 | 68.99 | 64.59 | 64.53 | 64.45 | 71.47 |
| Al2O3 | 9.06 | 11 | 9.01 | 13.97 | 13.14 | 13.14 | 6.24 |
| B2O3 | 7.21 | 2.8 | 7.18 | 5.18 | 7.29 | 7.33 | 7.32 |
| Li2O | 0 | 0 | 0 | 0 | 0 | 0 | 0 |
| Na2O | 10.02 | 12.88 | 9.05 | 13.57 | 11.19 | 11.16 | 4.69 |
| K2O | 0.6 | 0.01 | 0.59 | 0.01 | 1.5 | 1.5 | 1.57 |
| MgO | 1.99 | 3.01 | 3.05 | 2.53 | 1.16 | 1.17 | 4.19 |
| CaO | 0.04 | 0 | 0.04 | 0 | 1.06 | 1.07 | 0.05 |
| SrO | 1.99 | 0 | 1.92 | 0 | 0 | 0 | 4.31 |
| BaO | 0 | 0 | 0 | 0 | 0 | 0 | 0 |
| SnO2 | 0.1 | 0.12 | 0.09 | 0.1 | 0.1 | 0.1 | 0.09 |
| Fe2O3 | 0.05 | 0.05 | 0.05 | 0.05 | 0.01 | 0.05 | 0.05 |
| ZrO2 | 0.02 | 0.00 | 0.02 | 0.00 | 0.02 | 0.02 | 0.02 |
| RxO—Al2O3 | 5.6 | 4.9 | 5.6 | 2.14 | 1.8 | 1.8 | 8.6 |
| R2O—Al2O3 | 1.6 | 1.9 | 0.6 | −0.39 | −0.5 | −0.5 | 0.0 |
| R2O—(Al2O3 + MgO) | 0 | −1 | −2 | −2.92 | −2 | −2 | −4 |
| strain | 532.2 |  | 538.5 |  | 541.2 | 538.5 | 555.6 |
| anneal | 578 |  | 585.7 |  | 592.6 | 591.1 | 602.9 |
| soft | 806 |  | 828.8 |  | 863.8 | 869.3 | 832.5 |
| CTE | 66.5 |  | 63.3 |  | 73.9 | 74.2 | 54.9 |
| density | 2.425 |  | 2.414 | 2.4 | 2.386 | 2.388 | 2.453 |
| A | −1.6E+00 |  | −1.9E+00 |  | −3.1E+00 | −3.2E+00 | −1.8E+00 |

TABLE 6-continued

|  |  |  |  |  |  |
|---|---|---|---|---|---|
| B | 5.8E+03 | 6.4E+03 | 8.6E+03 | 8.8E+03 | 6.0E+03 |
| To | 188 | 162.6 | 57.48595 | 48.69154 | 202.4 |
| T(200P) | 1662 | 1669 | 1672 | 1661 | 1656 |
| 72 hr gradient boat int | 935 | 975 |  |  | 1000 |
| int liq visc |  |  |  |  |  |

|  | 36 | 37 | 38 | 39 | 40 | 41 | 42 |
|---|---|---|---|---|---|---|---|
| SiO2 | 72.76 | 68.29 | 70.67 | 72.35 | 69.58 | 69.09 | 72.45 |
| Al2O3 | 5.01 | 10.78 | 8.25 | 7.63 | 9.72 | 8.95 | 7.6 |
| B2O3 | 8.32 | 7.35 | 8.43 | 8.03 | 7.48 | 8.84 | 7.44 |
| Li2O | 0 | 0 | 0 | 0 | 0 | 0 | 0 |
| Na2O | 4.14 | 10.17 | 7.12 | 7.47 | 9.2 | 8.94 | 8.04 |
| K2O | 0.97 | 0.26 | 1.04 | 0.01 | 0.42 | 0.01 | 0 |
| MgO | 4.31 | 2.44 | 2.22 | 2.23 | 2.37 | 2.97 | 0 |
| CaO | 0.05 | 0.04 | 0.04 | 0.03 | 0.03 | 0.04 | 0.02 |
| SrO | 4.27 | 0.53 | 2.08 | 2.09 | 1.06 | 1.01 | 0 |
| BaO | 0 | 0 | 0 | 0 | 0 | 0 | 4.3 |
| SnO2 | 0.09 | 0.08 | 0.07 | 0.07 | 0.07 | 0.08 | 0.08 |
| Fe2O3 | 0.05 | 0.05 | 0.05 | 0.05 | 0.05 | 0.05 | 0.05 |
| ZrO2 | 0.02 | 0.02 | 0.02 | 0.02 | 0.02 | 0.02 | 0.02 |
| RxO—Al2O3 | 8.7 | 2.7 | 4.3 | 4.2 | 3.4 | 4.0 | 4.8 |
| R2O—Al2O3 | 0.1 | −0.4 | −0.1 | −0.2 | −0.1 | 0.0 | 0.4 |
| R2O—(Al2O3 + MgO) | −4 | −3 | −2 | −2 | −2 | −3 | 0.4 |
| strain | 556.7 | 547.1 | 535.2 | 541.6 | 542 | 535.3 | 552.1 |
| anneal | 605.8 | 599.8 | 583.8 | 590.2 | 593.2 | 583.8 | 597 |
| soft | 831.7 | 881.1 | 834.9 | 854.2 | 872.5 | 845.3 | 801.3 |
| CTE | 49.6 | 63.5 | 57.7 | 53 | 60.9 | 57.9 | 58.8 |
| density | 2.433 | 2.369 | 2.387 | 2.378 | 2.375 | 2.367 | 2.53 |
| A | −1.7E+00 | −3.0E+00 | −1.9E+00 | −2.1E+00 | −2.4E+00 | −2.4E+00 | −9.6E−01 |
| B | 5.9E+03 | 8.8E+03 | 6.6E+03 | 7.0E+03 | 7.7E+03 | 7.5E+03 | 4.6E+03 |
| To | 212.6 | 55.9 | 142.2 | 127.6 | 97.6 | 101.1 | 281.5 |
| T(200P) | 1679 | 1711 | 1728 | 1738 | 1727 | 1696 | 1677 |
| 72 hr gradient boat int | 1000 | 1020 | 935 | 970 | 1010 | 1050 | 875 |
| int liq visc |  | 1230646 | 3059865 | 1956914 | 1029006 | 307651 | 5133820 |

|  | 43 | 44 | 45 | 46 | 47 | 48 | 49 |
|---|---|---|---|---|---|---|---|
| SiO2 | 72.33 | 65.25 | 68.19 | 77.36 | 72.16 | 72.4 | 72.25 |
| Al2O3 | 7.7 | 13.64 | 10.84 | 6.34 | 7.68 | 7.52 | 7.64 |
| B2O3 | 7.6 | 5.12 | 7.37 | 1.99 | 7.63 | 7.51 | 7.59 |
| Li2O | 0 | 0 | 0 | 0 | 0 | 0 | 0 |
| Na2O | 8.12 | 13.32 | 10.47 | 14.13 | 6.98 | 8.07 | 8.14 |
| K2O | 0 | 0 | 0.01 | 0.01 | 1.04 | 0.01 | 0 |
| MgO | 1.41 | 2.49 | 2.42 | 0 | 2.25 | 3.21 | 4.21 |
| CaO | 1.21 | 0.03 | 0.04 | 0.03 | 0.04 | 0.04 | 0.02 |
| SrO | 1.47 | 0 | 0.53 | 0 | 2.09 | 1.1 | 0 |
| BaO | 0 | 0 | 0 | 0 | 0 | 0 | 0 |
| SnO2 | 0.08 | 0.07 | 0.07 | 0.09 | 0.07 | 0.08 | 0.08 |
| Fe2O3 | 0.05 | 0.05 | 0.05 | 0.05 | 0.05 | 0.05 | 0.05 |
| ZrO2 | 0.02 | 0.02 | 0.02 | 0.00 | 0.02 | 0.02 | 0.02 |
| RxO—Al2O3 | 4.5 | 2.2 | 2.6 | 7.8 | 4.7 | 4.9 | 4.7 |
| R2O—Al2O3 | 0.4 | −0.3 | −0.4 | 7.8 | 0.3 | 0.6 | 0.5 |
| R2O—(Al2O3 + MgO) | −1 | −3 | −3 | 8 | −2 | −3 | −4 |
| strain | 548.3 | 574.1 | 547.8 | 507 | 539.6 | 540.9 | 557.8 |
| anneal | 595.9 | 628.6 | 600.2 | 551.4 | 588.1 | 589.5 | 610.1 |
| soft | 834.4 | 910.1 | 881.8 | 764.7 | 840.8 | 855.4 | 880.6 |
| CTE | 55.7 | 73.5 | 63.2 | 74 | 56.8 | 54.5 | 54.5 |
| density | 2.382 | 2.397 | 2.369 | 2.406 | 2.388 | 2.364 | 2.332 |
| A | −1.7E+00 | −3.3E+00 | −2.8E+00 | 0.0E+00 | −1.9E+00 | −2.0E+00 | −2.3E+00 |
| B | 6.2E+03 | 8.9E+03 | 8.4E+03 | 0.0E+00 | 6.6E+03 | 7.0E+03 | 7.4E+03 |
| To | 178.2 | 87.5 | 75.5 | 0.0E+00 | 149.6 | 125.5 | 134.4 |
| T(200P) | 1745 | 1687 | 1708 | 0 | 1719 | 1745 | 1756 |
| 72 hr gradient boat int | 930 | 1020 | 1000 |  | 930 | 1050 | 1140 |
| int liq visc | 4203276 |  | 1747638 |  | 3548343 | 364209 | 124087 |

|  | 50 | 51 | 52 | 53 | 54 | 55 | 56 |
|---|---|---|---|---|---|---|---|
| SiO2 | 69.86 | 69.17 | 67.89 | 64.62 | 67.94 | 72.43 | 69.67 |
| Al2O3 | 8.56 | 8.97 | 8.56 | 13.85 | 10.68 | 7.63 | 9.7 |
| B2O3 | 10.12 | 7.25 | 10.16 | 5.22 | 7.19 | 7.47 | 7.44 |
| Li2O | 0 | 0 | 0 | 0 | 0 | 0 | 0 |
| Na2O | 8.54 | 10.45 | 8.48 | 13.6 | 10.88 | 8.04 | 9.54 |
| K2O | 0.01 | 0.01 | 0.01 | 0.01 | 0.01 | 0 | 0.05 |
| MgO | 1.38 | 2.95 | 2.37 | 2.52 | 2.32 | 0.04 | 2.36 |
| CaO | 0.03 | 0.04 | 0.04 | 0.04 | 0.04 | 4.24 | 0.04 |
| SrO | 1.36 | 1.01 | 2.35 | 0 | 0.81 | 0 | 1.06 |

TABLE 6-continued

|  |  |  |  |  |  |  |  |
|---|---|---|---|---|---|---|---|
| BaO | 0 | 0 | 0 | 0 | 0 | 0 | 0 |
| SnO2 | 0.07 | 0.08 | 0.07 | 0.08 | 0.07 | 0.08 | 0.07 |
| Fe2O3 | 0.05 | 0.05 | 0.05 | 0.05 | 0.05 | 0.05 | 0.05 |
| ZrO2 | 0.02 | 0.02 | 0.02 | 0.02 | 0.02 | 0.02 | 0.02 |
| RxO—Al2O3 | 2.8 | 5.5 | 4.7 | 2.3 | 3.4 | 4.7 | 3.4 |
| R2O—Al2O3 | 0.0 | 1.5 | −0.1 | −0.2 | 0.2 | 0.4 | −0.1 |
| R2O—(Al2O3 + MgO) | −1 | −1 | −2 | −3 | −2 | 0 | −2 |
| strain | 520.8 | 535.1 | 528.8 | 570.4 | 542 | 559.6 | 543.8 |
| anneal | 569.8 | 581.6 | 575.9 | 623.9 | 591.2 | 507.4 | 594.7 |
| soft | 823.5 | 825 | 803.8 | 899.6 | 856.8 | 834.5 | 878.8 |
| CTE | 56.4 | 63.9 | 57.9 | 73.8 | 65.2 | 56.5 | 60.4 |
| density | 2.354 | 2.396 | 2.398 | 2.4 | 2.386 | 2.372 | 2.376 |
| A | −2.1E+00 | −1.8E+00 | −1.9E+00 | −3.4E+00 | −2.6E+00 | −1.3E+00 | −2.4E+00 |
| B | 7.1E+03 | 6.2E+03 | 6.2E+03 | 9.0E+03 | 7.9E+03 | 5.2E+03 | 7.7E+03 |
| To | 103.1 | 168.2 | 165.5 | 79.1 | 89.5 | 253.5 | 100.1 |
| T(200P) | 1718 | 1680 | 1635 | 1668 | 1692 | 1704 | 1727 |
| 72 hr gradient boat int | 890 | 940 | 925 | 1015 | 975 | 980 | 1010 |
| int liq visc |  | 1655694 |  |  | 1878562 | 759047 | 1089696 |

|  | 57 | 58 | 59 | 60 | 61 | 62 | 63 |
|---|---|---|---|---|---|---|---|
| SiO2 | 72.24 | 72.1 | 72.27 | 70.16 | 70.17 | 69.3 | 76.83 |
| Al2O3 | 7.42 | 7.42 | 7.66 | 8.97 | 8.95 | 9.77 | 6.64 |
| B2O3 | 7.49 | 7.39 | 7.61 | 7.22 | 7.17 | 7.07 | 3.81 |
| Li2O | 0 | 0 | 0 | 0 | 0 | 0 | 0 |
| Na2O | 8.57 | 9.01 | 7.95 | 10.47 | 8.94 | 10.9 | 12.54 |
| K2O | 0 | 0 | 0 | 0.01 | 0.01 | 0 | 0.01 |
| MgO | 2.1 | 2 | 0 | 1.99 | 3.57 | 1.92 | 0 |
| CaO | 0.02 | 0.02 | 0.02 | 0.03 | 0.04 | 0.91 | 0.02 |
| SrO | 2.02 | 1.91 | 4.35 | 1.01 | 1.01 | 0 | 0 |
| BaO | 0 | 0 | 0 | 0 | 0 | 0 | 0 |
| SnO2 | 0.08 | 0.08 | 0.07 | 0.08 | 0.08 | 0.08 | 0.1 |
| Fe2O3 | 0.05 | 0.05 | 0.05 | 0.05 | 0.05 | 0.05 | 0.05 |
| ZrO2 | 0.02 | 0.02 | 0.02 | 0.02 | 0.02 | 0.02 | 0.00 |
| RxO—Al2O3 | 5.3 | 5.5 | 4.7 | 4.5 | 4.6 | 4.0 | 5.9 |
| R2O—Al2O3 | 1.2 | 1.6 | 0.3 | 1.5 | 0.0 | 1.1 | 5.9 |
| R2O—(Al2O3 + MgO) | −1 | 0 | 0 | 0 | −4 | −1 | 6 |
| strain |  |  | 551 | 533.9 | 547.3 |  | 530.4 |
| anneal |  |  | 596.6 | 580.6 | 596.5 |  | 574.9 |
| soft | 823 | 816.4 | 814.2 | 822.3 | 860.6 | 844.3 | 782.6 |
| CTE | 58.4 | 57.1 | 57.1 | 63.6 | 58.5 | 65.3 | 68.4 |
| density | 2.393 | 2.397 | 2.454 | 2.389 | 2.376 | 2.371 | 2.403 |
| A |  |  | −1.1E+00 | −1.7E+00 | −2.4E+00 |  | −7.6E−01 |
| B |  |  | 4.9E+03 | 6.2E+03 | 7.5E+03 |  | 4.3E+03 |
| To |  |  | 259.3 | 165.5 | 111.6 |  | 2.7E+02 |
| T(200P) |  |  | 1701 | 1695 | 1707 |  | 1682 |
| 72 hr gradient boat int |  |  | 920 | 930 | 1110 |  |  |
| int liq visc |  |  | 2065037 | 2181126 | 132055 |  |  |

|  | 64 | 65 | 66 | 67 | 68 | 69 |
|---|---|---|---|---|---|---|
| SiO2 | 68.66 | 68.52 | 67.75 | 67.91 | 68.93 | 72.4 |
| Al2O3 | 10.09 | 11.14 | 12.68 | 10.97 | 9.99 | 7.03 |
| B2O3 | 7.25 | 7.25 | 3.7 | 8.07 | 9.06 | 7.54 |
| Li2O | 0 | 0 | 0 | 0 | 0 | 0 |
| Na2O | 10.24 | 10.33 | 13.3 | 10.34 | 9.36 | 8.57 |
| K2O | 0.65 | 0.67 | 0.01 | 0.01 | 0.01 | 0 |
| MgO | 2.02 | 1.01 | 2.43 | 2.5 | 2.48 | 2.21 |
| CaO | 0.92 | 0.92 | 0 | 0.04 | 0.04 | 0.02 |
| SrO | 0 | 0 | 0 | 0 | 0 | 2.09 |
| BaO | 0 | 0 | 0 | 0 | 0 | 0 |
| SnO2 | 0.1 | 0.09 | 0.09 | 0.1 | 0.09 | 0.08 |
| Fe2O3 | 0.05 | 0.05 | 0.05 | 0.05 | 0.05 | 0.05 |
| ZrO2 | 0.02 | 0.02 | 0.00 | 0.00 | 0.00 | 0.02 |
| RxO—Al2O3 | 3.7 | 1.8 | 3.060 | 1.9 | 1.9 | 5.9 |
| R2O—Al2O3 | 0.8 | −0.1 | 0.6 | −0.6 | −0.6 | 1.5 |
| R2O—(Al2O3 + MgO) | −1 | −1 | −1.8 | −3 | −3 | −1 |
| strain | 536.1 | 540.3 | 576.5 | 547.2 | 537.1 |  |
| anneal | 585.1 | 592.5 | 630.8 | 601.3 | 589.6 |  |
| soft | 842.9 | 874.7 |  | 883.9 | 874.6 | 814.5 |
| CTE | 66.4 | 66.1 |  | 62.1 | 58.3 | 57.3 |
| density | 2.373 | 2.364 | 2.403 | 2.351 | 2.333 | 2.397 |
| A | −2.2E+00 | −2.9E+00 | −3.2 | −3.0E+00 | −3.1E+00 |  |
| B | 7.1E+03 | 8.7E+03 | 9081.6 | 8.8E+03 | 9.2E+03 |  |
| To | 120.6 | 45.4 | 75.4 | 58.3 | 20.4 |  |

TABLE 6-continued

| T(200P) | 1701 | 1724 | 1726 | 1706 | 1727 |
|---|---|---|---|---|---|
| 72 hr gradient boat int | 920 | 940 | | | |
| int liq visc | | 7235117 | | | |

What is claimed is:

1. A display device comprising:
   a light guide plate comprising:
      a glass sheet with a front face having a width and a height, a back face opposite the front face, and a thickness between the front face and back face, forming four edges around the front and back faces, and
      a glass composition comprising from 0 mol % to about 15 mol % $Al_2O_3$, from about 5 mol % to about 20 mol % $B_2O_3$, and from 0 mol % to about 25 mol % $R_xO$,
         wherein R is any one or more of Li, Na, K, Rb, Cs and x is 2, or Zn, Mg, Ca, Sr or Ba and x is 1,
         wherein the mol % of $Al_2O_3$ is less than or substantially equal to the mol % $R_xO$, and
         wherein Fe is less than about 50 ppm; and
   a light source illuminating the light guide plate.

2. The display device of claim 1, wherein the glass composition further comprises from about 50 mol % to about 90 mol % $SiO_2$ and from about 5 mol % to about 12 mol % $B_2O_3$.

3. The display device of claim 1, wherein the glass composition comprises less than 1 ppm of each of Co, Ni, and Cr.

4. The display device of claim 1, wherein the light guide plate produces less than or equal to 2 dB/500 mm of light attenuation.

5. The display device of claim 1, wherein the light guide plate produces less than or equal to 1 dB/500 mm absorption.

6. The display device of claim 1, wherein the light guide plate produces less than or equal to 0.5 dB/500 mm absorption.

7. The display device of claim 1, wherein the glass composition satisfies:

Fe+30Cr+35Ni<about 60 ppm.

8. The display device of claim 1, wherein the glass composition satisfies:

Fe+30Cr+35Ni<about 20 ppm.

9. The display device of claim 1, wherein $R_xO$—$Al_2O_3$>0.

10. The display device of claim 9, wherein 0<$R_xO$—$Al_2O_3$<25.

11. The display device of claim 1, wherein x=2 and wherein $R_2O$—$Al_2O_3$<15.

12. The display device of claim 11, wherein $R_2O$—$Al_2O_3$<2.

13. The display device of claim 1, wherein x=2 and wherein $R_2O$—$Al_2O_3$—MgO>−15.

14. The display device of claim 1, wherein 0<($R_xO$—$Al_2O_3$)<25, −11<($R_2O$—$Al_2O_3$)<11, and −15<($R_2O$—$Al_2O_3$—MgO)<11.

15. The display device of claim 1, wherein −1<($R_2O$—$Al_2O_3$)<2 and −6<($R_2O$—$Al_2O_3$—MgO)<1.

16. The display device of claim 1, wherein the transmittance of the light guide plate at 450 nm with at least 500 mm in length is greater than or equal to 85%, the transmittance of the light guide plate at 550 nm with at least 500 mm in length is greater than or equal to 90%, or the transmittance of the light guide plate at 630 nm with at least 500 mm in length is greater than or equal to 85%, and combinations thereof.

17. The display device of claim 1, wherein Fe is less than about 20 ppm.

18. The display device of claim 1, wherein Fe is less than about 10 ppm.

19. The display device of claim 1, wherein the glass sheet is chemically strengthened.

20. The display device of claim 1, wherein the light source is selected from the group consisting of an LED, CCFL, OLED, and combinations thereof.

21. The display device of claim 1, wherein a thickness of the display device is less than 5 mm.

22. A display device comprising:
   a light guide plate comprising:
      a glass sheet with a front face having a width and a height, a back face opposite the front face, and a thickness between the front face and back face, forming four edges around the front and back faces,
      a Youngs' modulus ranging from about 62 GPa to about 78 GPa, and
      a glass composition comprising from 0 mol % to about 15 mol % $Al_2O_3$, from about 5 mol % to about 20 mol % $B_2O_3$, and from about 2 mol % to about 25 mol % $R_xO$, wherein R is any one or more of Li, Na, K, Rb, Cs and x is 2, or Zn, Mg, Ca, Sr or Ba and x is 1; and
   a light source illuminating the light guide plate,
   wherein the transmittance of the glass sheet at 450 nm with at least 500 mm in length is greater than or equal to 85%, the transmittance of the glass sheet at 550 nm with at least 500 mm in length is greater than or equal to 90%, or the transmittance of the glass sheet at 630 nm with at least 500 mm in length is greater than or equal to 85%; and
   wherein a thickness of the display device is less than 5 mm.

23. The display device of claim 22, wherein the glass composition comprises a Fe concentration of less than about 50 ppm.

24. The display device of claim 22, wherein the glass composition comprises a Fe concentration of less than about 20 ppm.

25. The display device of claim 22, wherein the glass composition comprises a Fe concentration of less than about 10 ppm.

26. A display device comprising:
   a light guide plate comprising:
      a glass sheet with a front face having a width and a height, a back face opposite the front face, and a thickness between the front face and back face, forming four edges around the front and back faces,
      a Youngs' modulus ranging from about 62 GPa to about 78 GPa, and
      a glass composition comprising from 0 mol % to about 15 mol % $Al_2O_3$, from about 5 mol % to about 20 mol % $B_2O_3$, and from about 2 mol % to about 25 mol % $R_xO$, wherein R is any one or more of Li, Na, K, Rb, Cs and x is 2, or Zn, Mg, Ca, Sr or Ba and x is 1, and wherein $R_xO-Al_2O_3$ is <25; and a light source illuminating the light guide plate, wherein the transmittance of the glass sheet at 450 nm with at least 500 mm in length is greater than or equal to 85%, the transmittance of the glass sheet at 550 nm with at least 500 mm in length is greater than or equal to 90%, or the transmittance of the glass sheet at 630 nm with at least 500 mm in length is greater than or equal to 85%; and wherein a thickness of the display device is less than 5 mm.

27. The display device of claim 26, wherein the glass composition comprises a Fe concentration of less than about 50 ppm.

28. The display device of claim 26, wherein the glass composition comprises a Fe concentration of less than about 20 ppm.

29. The display device of claim 26, wherein the glass composition comprises a Fe concentration of less than about 10 ppm.

30. The display device of claim 26, wherein x=2 and $R_xO-Al_2O_3$<12.

31. The display device of claim 26, wherein $R_xO-Al_2O_3$>0.

32. The display device of claim 30, wherein $R_2O-Al_2O_3$<2.

33. The display device of claim 26, wherein x=2 and wherein $R_2O-Al_2O_3-MgO$>−15.

34. The display device of claim 26, wherein 0<($R_xO-Al_2O_3$)<25, −11<($R_2O-Al_2O_3$)<11, and −15<($R_2O-Al_2O_3-MgO$)<11.

35. The display device of claim 26, wherein −1<($R_2O-Al_2O_3$)<2 and −6<($R_2O-Al_2O_3-MgO$)<1.

36. A display device comprising:

a light guide plate comprising:
   a glass sheet with a front face having a width and a height, a back face opposite the front face, and a thickness between the front face and back face, forming four edges around the front and back faces,
   a glass composition comprising from about 50 mol % to about 90 mol % $SiO_2$, from 0 mol % to about 15 mol % $Al_2O_3$, from about 5 mol % to about 12 mol % $B_2O_3$, and from 0 mol % to about 25 mol % $R_xO$, wherein R is any one or more of Li, Na, K, Rb, Cs and x is 2, or Zn, Mg, Ca, Sr or Ba and x is 1, and wherein 0<($R_xO-Al_2O_3$)<25, −11<($R_2O-Al_2O_3$)<11, and −15<($R_2O-Al_2O_3-MgO$)<11; and a light source illuminating the light guide plate, wherein the light guide plate produces 2 dB/500 mm or less of light attenuation.

37. The display device of claim 36, wherein the glass composition comprises a Fe concentration of less than about 50 ppm.

38. The display device of claim 36, wherein the glass composition satisfies:

Fe+30Cr+35Ni<about 60 ppm.

* * * * *